United States Patent
Kuhl et al.

(10) Patent No.: US 7,212,528 B2
(45) Date of Patent: May 1, 2007

(54) SYSTEM AND METHOD FOR REASSEMBLING PACKETS IN A NETWORK ELEMENT

(75) Inventors: Timothy Harris Kuhl, Kanata (CA); Mark Jason Thibodeau, Nepean (CA); David Michael Motz, Ottawa (CA)

(73) Assignee: Alcatel Canada Inc., Kanata, Ontario (CA)

( * ) Notice: Subject to any disclaimer, the term of this patent is extended or adjusted under 35 U.S.C. 154(b) by 963 days.

(21) Appl. No.: 10/023,641

(22) Filed: Dec. 21, 2001

(65) Prior Publication Data

US 2003/0118052 A1 Jun. 26, 2003

(51) Int. Cl.
*H04L 12/28* (2006.01)
*H04Q 11/00* (2006.01)

(52) U.S. Cl. ................. 370/389; 370/395.52; 370/412; 370/394

(58) Field of Classification Search ...................... None
See application file for complete search history.

(56) References Cited

U.S. PATENT DOCUMENTS

| | | | |
|---|---|---|---|
| 5,850,395 | A | 12/1998 | Caldara et al. |
| 5,956,342 | A | 9/1999 | Caldara et al. |
| 6,449,708 | B2 * | 9/2002 | Dewhurst et al. ............. 712/16 |
| 6,526,023 | B1 * | 2/2003 | Koga et al. .................. 370/230 |
| 6,963,572 | B1 * | 11/2005 | Carr et al. ................... 370/401 |
| 6,970,460 | B2 * | 11/2005 | Watanabe et al. ........... 370/389 |

FOREIGN PATENT DOCUMENTS

| EP | 1009132 | 6/2000 |
|---|---|---|
| EP | 1117213 | 7/2001 |
| EP | 1137227 | 9/2001 |
| WO | WO 00/38375 | 6/2000 |
| WO | WO 01/65765 | 9/2001 |

OTHER PUBLICATIONS

Nong G et al. "Efficient Scheduling of Variable-Length IP Packets On High-Speed Switches", 1999 IEEE Global Telecommunications Conference, New York, NY: IEEE, US, vol. 2, Dec. 5, 1999, pp. 1407-1411.

Kim H. et al. "A Packet-Based Scheduling Algorithm For High-Speed Switches", TENCON 2001, IEEE Region 10 Annual Conference, New York, NY: IEEE, US, vol. 1 of 2, Aug. 19, 2001, pp. 117-121.

Parulkar G. et al. "AITPM: A Strategy For Integrating IP with ATM", Computer Communications Review, Associated For Computing Machinery, New York: vol. 25, No. 4, Oct. 1, 1995, pp. 49-58.

Blau S. et al. "AXD 301: A New Generation ATM Switching System", Computer Networks and ISDN Systems, North Holland Publishing, Amsterdam, NL, vol. 31, No. 6, Mar. 25, 1999, pp. 559-582.

* cited by examiner

*Primary Examiner*—Seema S. Rao
*Assistant Examiner*—Robert C. Scheibel, Jr.
(74) *Attorney, Agent, or Firm*—Marks & Clerk

(57) ABSTRACT

A system and method of reassembling packets from traffic flows in a network element is provided. Each of the packets has at least one data part. The method includes the steps (1) queuing each of the data parts of the packets of traffic flows in a single reassembly queue in a sorted order, the data parts of each of the packets being continuously grouped without data parts of another packet being interleaved therein and (2) reassembling the data parts of each of the packets queued in the single reassembly queue.

15 Claims, 18 Drawing Sheets

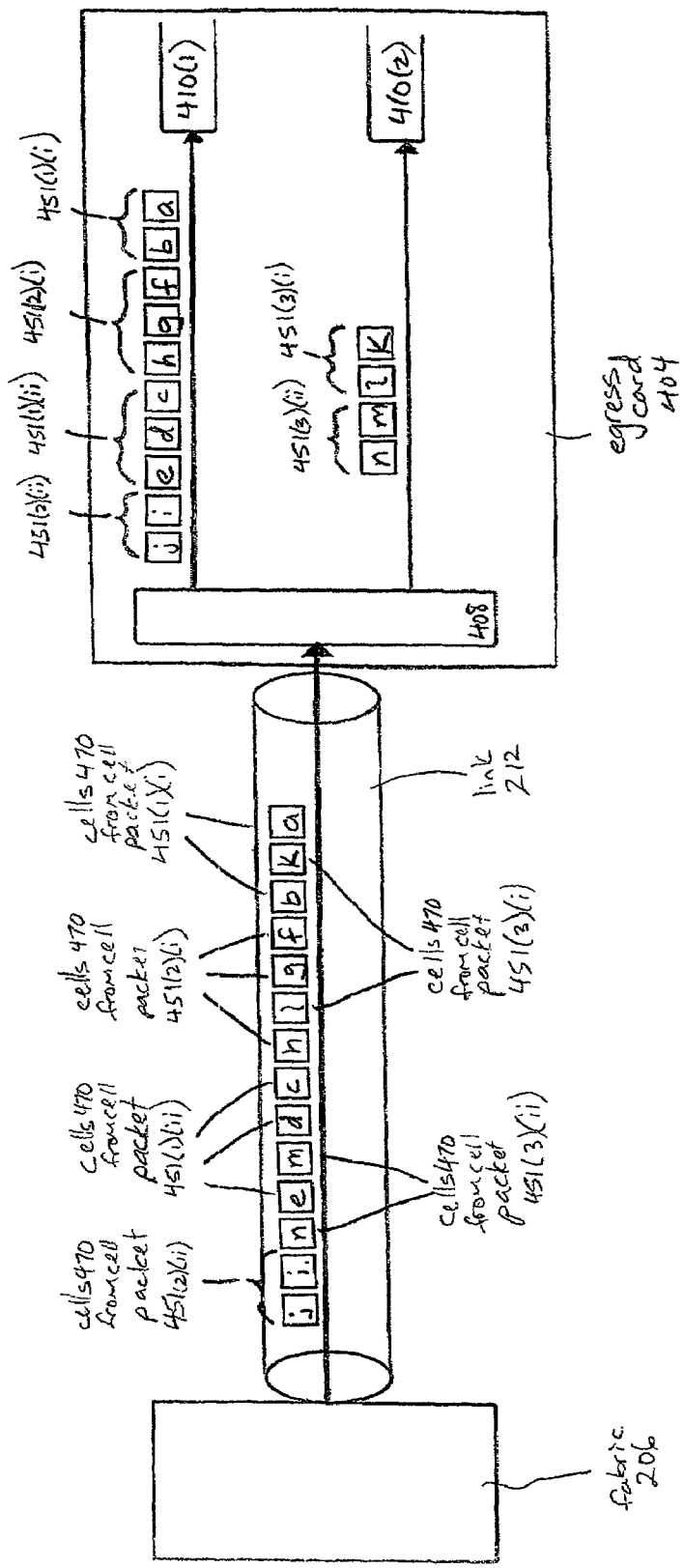
Figure 4B(ii)

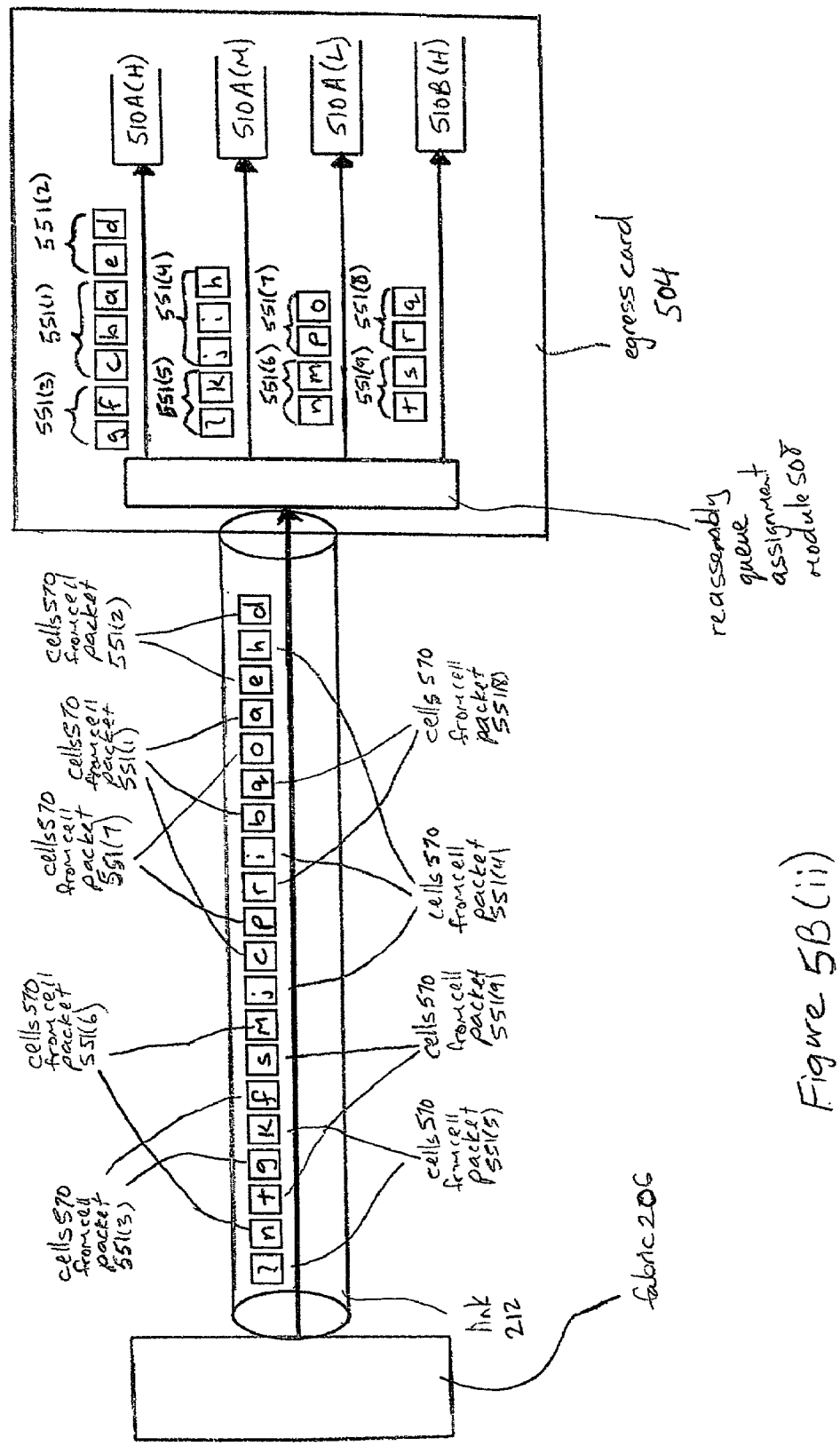
Figure 5B(ii)

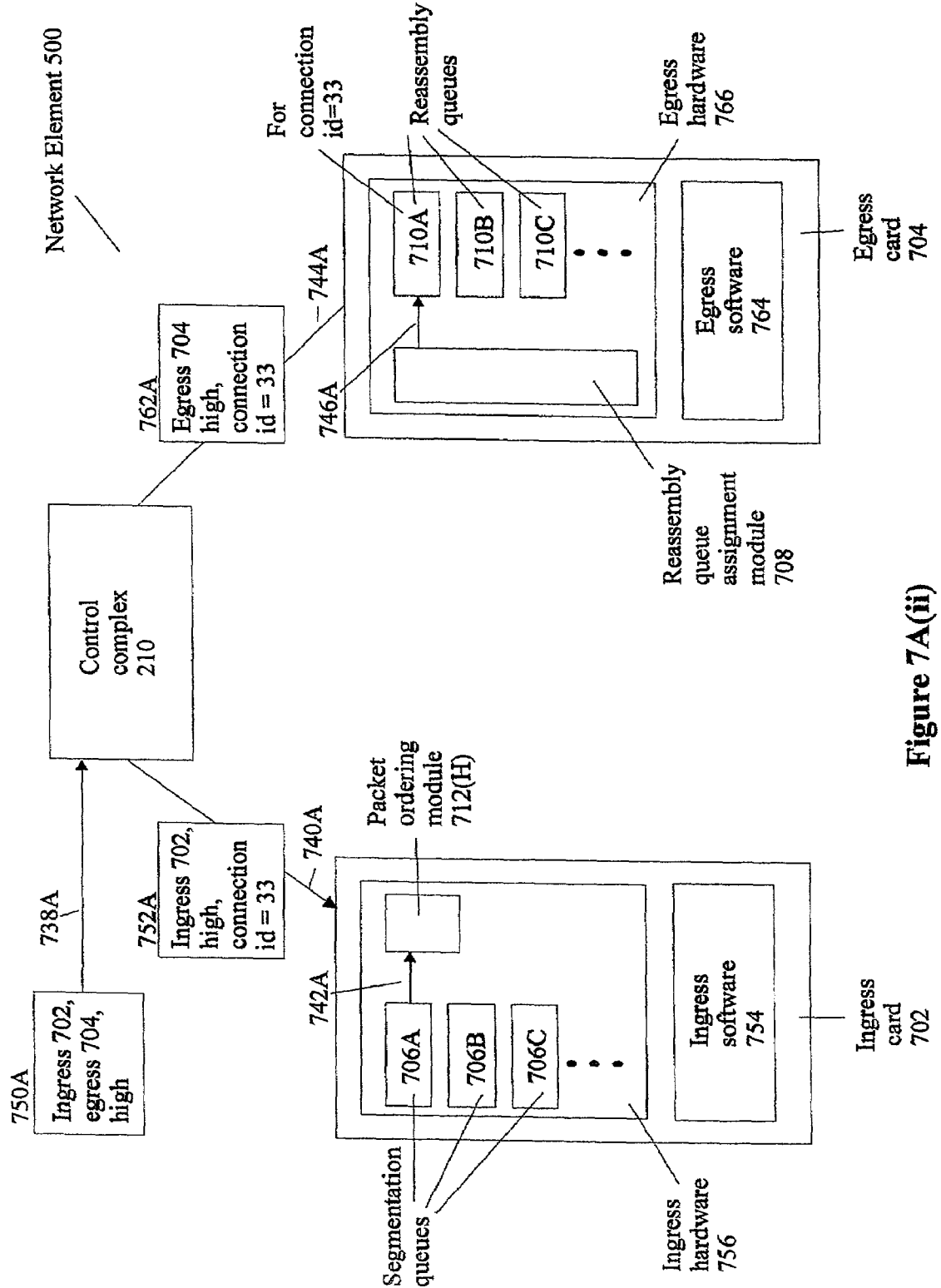
Figure 7A(ii)

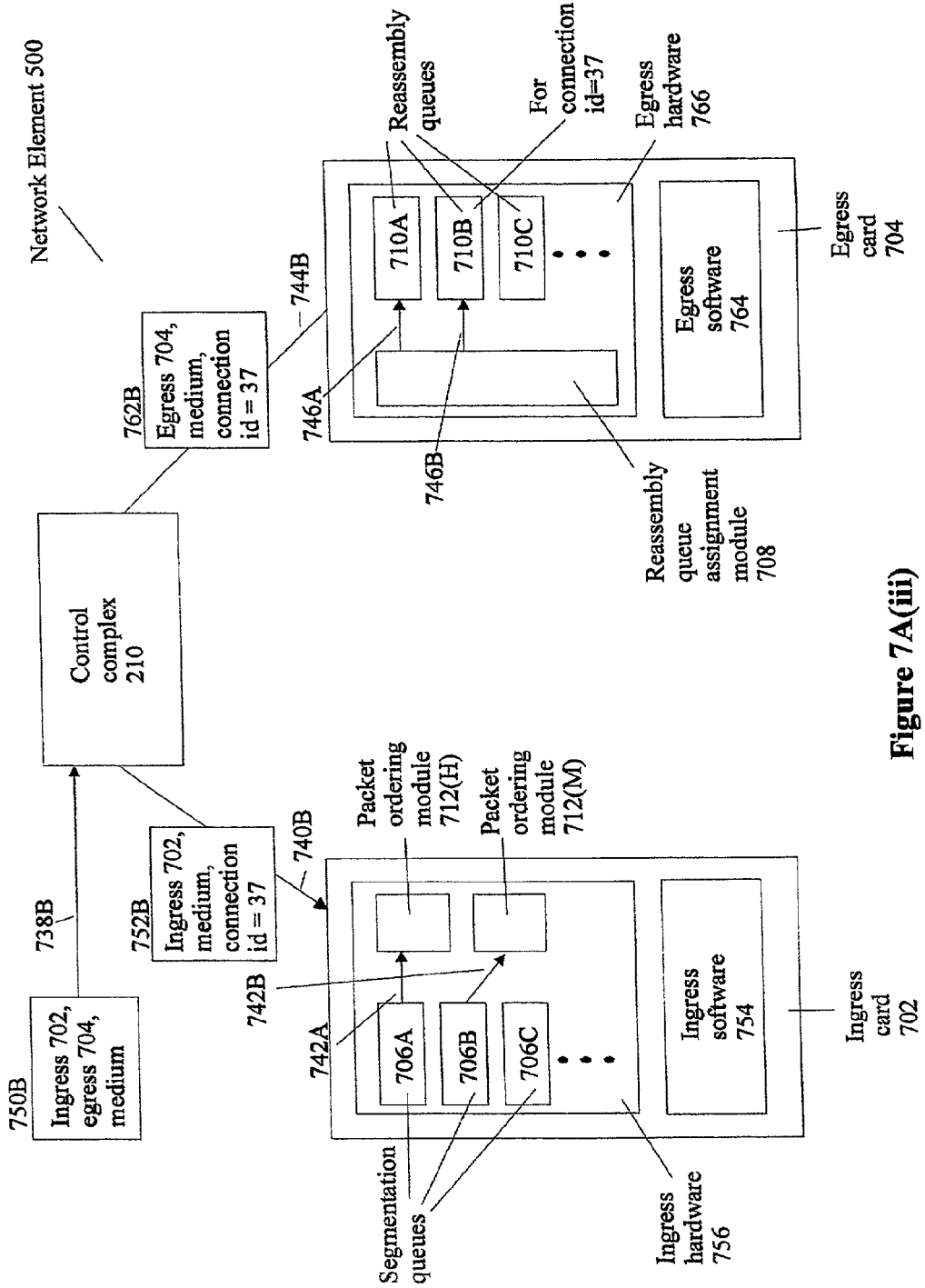
Figure 7A(iii)

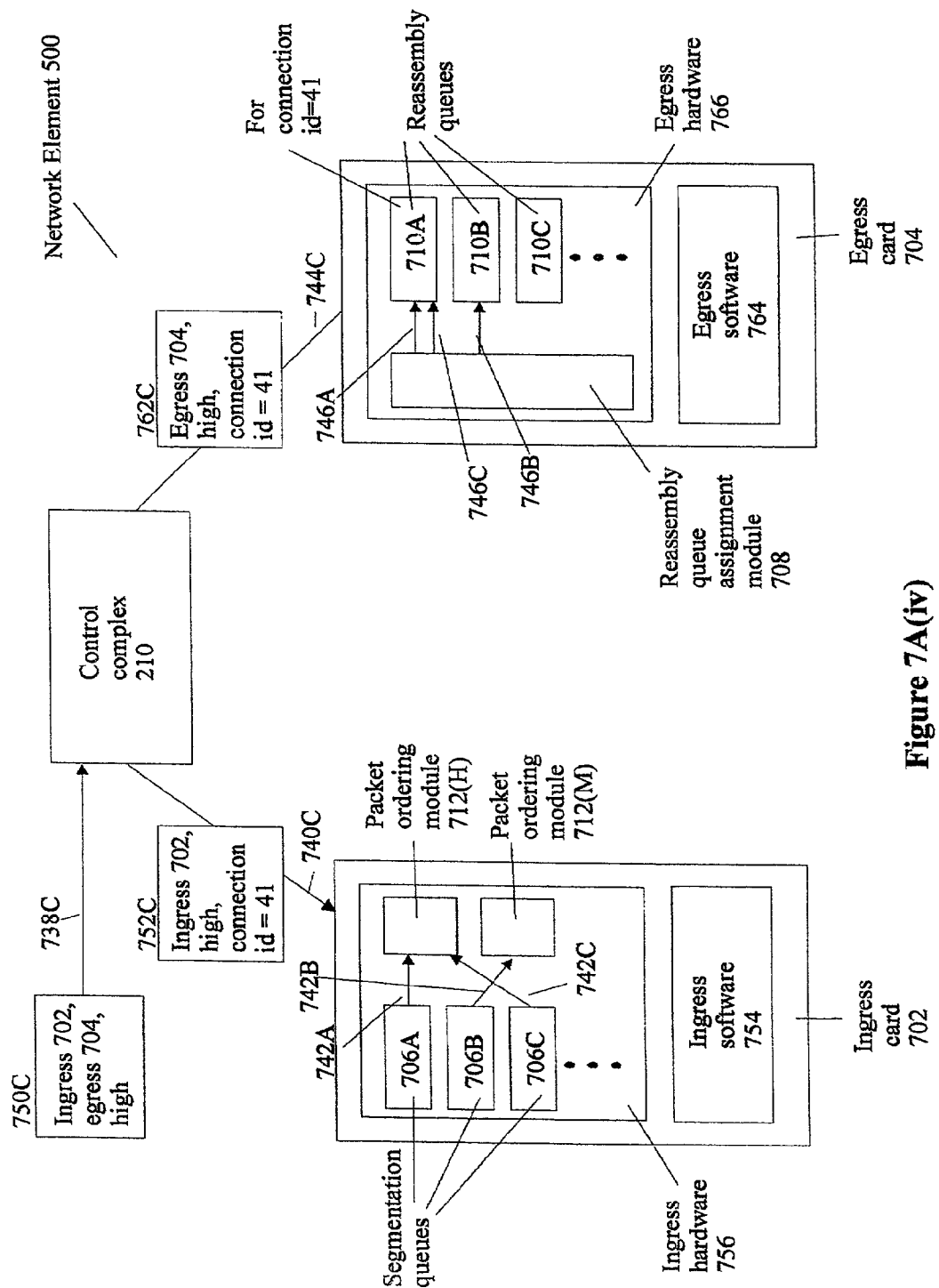
Figure 7A(iv)

SYSTEM AND METHOD FOR REASSEMBLING PACKETS IN A NETWORK ELEMENT

FIELD OF THE INVENTION

The invention relates to a system and method for assembling packets in a network element.

BACKGROUND OF INVENTION

In a communications network, network elements such as switches and routers route data from traffic flows to their destinations. Cell-based network elements transmit data internally using fixed-length cells. Alternatively, traffic flows routed through the network element may comprise variable-length frames. In processing frames from a frame-based traffic flow routed through a cell-based network element, the frames are segmented into cells for switching or routing through the network element. The cells are then reassembled, after internal switching or routing, into the frames transmitted from the network element. As network elements are required to route data from an increasing number of traffic flows, the hardware resources required to segment and assemble frames from frame-based traffic flows increases.

There is a need for a system and method for assembling packets in a network element that minimizes the hardware resources required to segment and assemble frames from frame-based traffic flows.

SUMMARY OF INVENTION

In a first aspect, a method of reassembling packets from traffic flows in a network element is provided. Each of the packets has at least one data part. The method includes the steps (1) queuing each of the data parts of the packets of traffic flows in a single reassembly queue in a sorted order, the data parts of each of the packets being continuously grouped without a data part of another packet being interleaved therein and (2) reassembling the data parts queued in the single reassembly queue.

The method may further include an initial step of transmitting the data parts to an egress card of the network element in a packet ordered stream, the data parts of each of the packets may be continuously grouped without an interleaved data part of another packet and wherein steps (1) and (2) may be performed at the egress card.

The traffic flows may transmit frames to the network element and the initial step may further include queuing frames of each traffic flow prior to transmitting each of the data parts to the egress card and segmenting frames in traffic flows into data parts after queuing the frames.

The network element may include an ingress card and the initial steps may be performed by the ingress card.

Each traffic flow of traffic flows may have a weight and each traffic flow may receive bandwidth on the packet ordered stream based on the weight of each traffic flow.

Each traffic flow of traffic flows may be associated with a class of traffic flow, the class indicating a priority for the traffic flow.

In a second aspect, a network element providing datapath connectivity for a plurality of traffic flows is provided. The network element transmits cells within the network element. Traffic flows transmit variable-length packets to the network element. The network element includes an ingress card having a segmentation module adapted to segment the variable-length packets of traffic flows into at least one cell, the ingress card transmitting the cells formed from each of the variable-length packets in a packet ordered stream grouped together in a sorted order. The network element further includes an egress card receiving the cells transmitted in the packet ordered stream. The egress card has an egress queuing module adapted to queue the cells of the variable-length packets of traffic flows into a single reassembly queue and a reassembly module adapted to reassemble the cells queued in the single reassembly queue into variable-length packets.

In a third aspect, a method of providing traffic guarantees for a plurality of traffic flows in a network element is provided. Each traffic flow of traffic flows has a weight. The network element has an ingress card and an egress card. The method includes receiving traffic flows at the ingress card in the network element and transmitting traffic flows to the egress card in the network element over a packet stream, a traffic flow of traffic flows receiving bandwidth on the packet stream based on the weight of the traffic flow.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 4B($ii$) is a block diagram illustrating an example of transmission of cells from a fabric to an egress card of the network element of FIG. 4A;

FIG. 5B($ii$) is a block diagram illustrating an example of transmission of cells from a fabric to an egress card of the network element of FIG. 5A;

FIG. 7A($ii$) is a block diagram exemplary of establishing a datapath connection in the network element of FIG. 5A;

FIG. 7A($iii$) is a block diagram exemplary of establishing a second datapath connection in the network element of FIG. 5A;

FIG. 7A(*iv*) is a block diagram exemplary of establishing a third datapath connection in the network element of FIG. 5A;

DETAILED DESCRIPTION OF THE EMBODIMENTS

Figure 1:
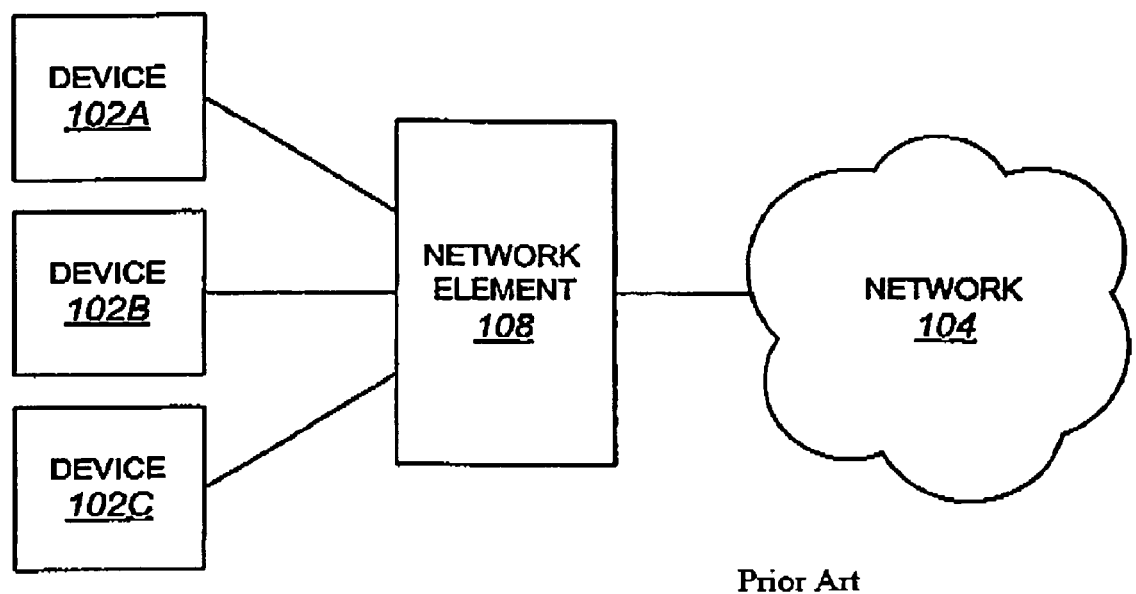
FIG. 1 is a block diagram of a network connected to a network element of the prior art.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Briefly, an egress line card in a network element of an embodiment reuses an assembly queue for a number of traffic flows rather than assigning a separate assembly queue for each traffic flow. This reduces the number of assembly queues required. Additionally, the network element of the embodiment provides traffic guarantees for traffic flows through the network element at the ingress line card. The ingress line card provides bandwidth-weighted traffic flows for its received traffic corresponding to transmission weights assigned to the traffic flow into the ingress line card.

First, a description of a prior art queuing system is provided, followed by a description of a system architecture of an embodiment, followed by a description of operational routing of traffic flows of an embodiment.

1.0 System Architecture and Operation of the Prior Art

First, referring to FIG. 1, prior art network element 108 is shown. Network element 108 connects devices 102A, 102B and 102C such as customer premise equipment (CPEs) allowing devices 102 to transmit and receive traffic flows of data to network cloud 104, thereby acting as a switch and providing a connection point for devices 102 to network cloud 104. Network element 108 of the prior art may provide switching or routing for up to 128,000 traffic flows from each CPE. It will be appreciated that network element 108 may act as a router between networks similarly providing routing for traffic flows. It will be appreciated that terms such as "routing switch", "communication switch", "communication device", "switch", "router", "forwarding device" and other terms known in the art may be used to describe network element 108.

Figure 2:
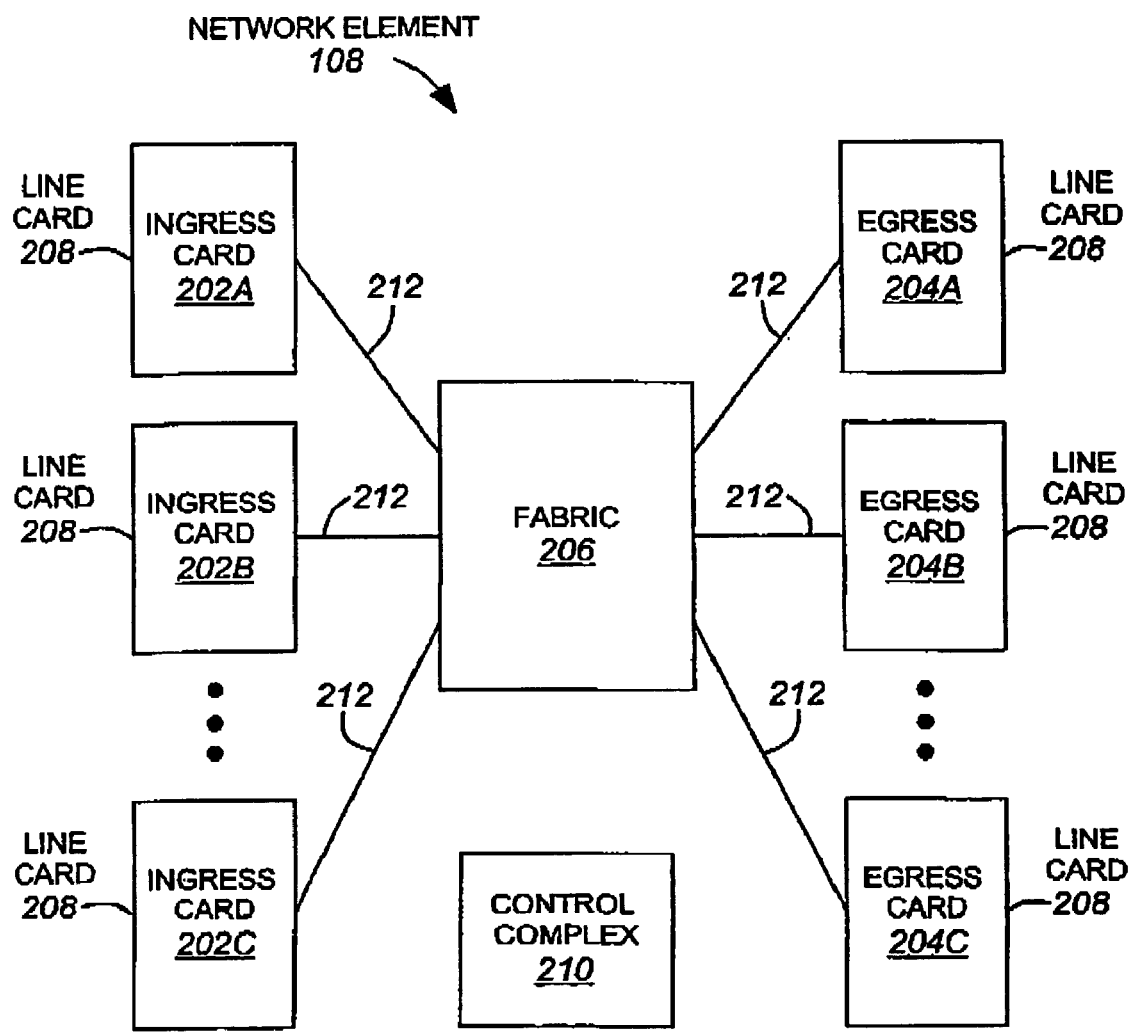
FIG. 2 is a block diagram of components of the network element of FIG. 1.

Referring to FIG. 2, network element 108 comprises a plurality of line cards 208 (ingress cards 202 and egress cards 204), a plurality of input/output (I/O) cards (not shown), switching or routing fabric 206, a control complex 210 and links 212.

I/O cards provide input and output processing for network element 108, allowing connection of devices, such as devices 102A, 102B, and 102C (FIG. 1), and networks, such as network 104, to network element 108. I/O cards connect to line cards 208.

Line cards 208 perform shaping of traffic received from the I/O cards before forwarding the traffic to the fabric 206. Line cards are ingress cards 202 and egress cards 204. An ingress card 202 provides ingress processing for a traffic flow entering network element 108. An egress card 204 provides egress processing for a traffic flow exiting network element 108. It will be appreciated that a line card 208 may be both an ingress card 202 and an egress card 204 if it provides both ingress processing and egress processing in network element 108.

Ingress cards 202A, 202B and 202C provide a datapath connection to fabric 206 for traffic flows entering network element 108 at their connected I/O cards. Traffic flows are transmitted from an ingress card 202 to fabric 206 over a link 212. Links 212 are backplane connections that in a multi-shelf system will traverse a HISL (high speed inter-shelf link). Fabric 206 provides cell switching or routing capacity for network element 108. Fabric 206 sends the traffic flow to the appropriate egress card 204 over another link 212. At egress cards 204A, 204B and 204C, traffic flows are transmitted through I/O cards and exit network element 108.

Control complex 210 provides central management of switching or routing and operational aspects of network element 108.

Figure 3A:
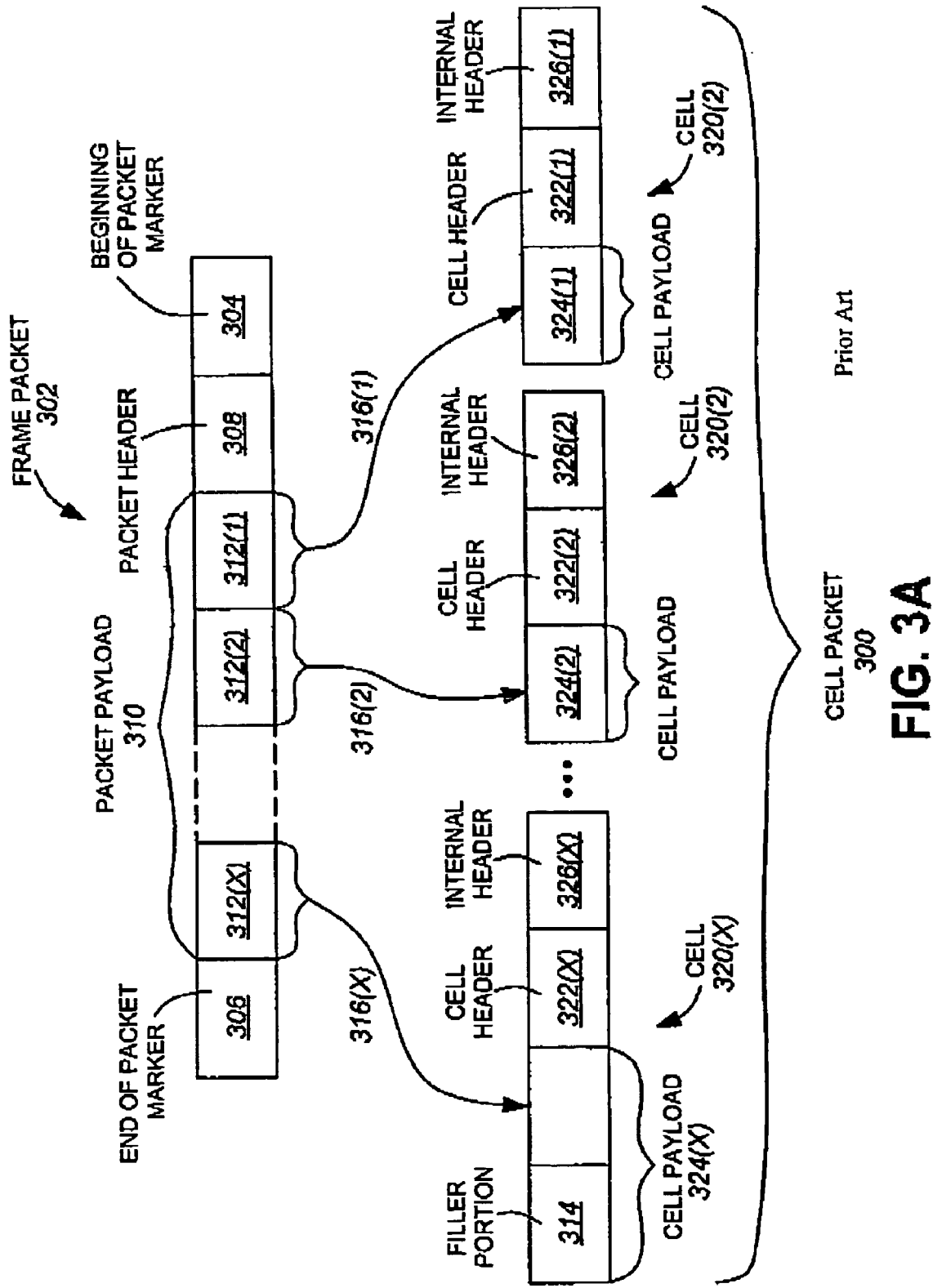
FIG. 3A is a block diagram of conversion of a frame based packet into a cell based packet in the network element of FIG. 1.

In the prior art, network element 108 processes data encapsulated in cells or frames. Referring to FIG. 3A, an ATM cell 320, as known in the art, carries 48 bytes of user data in cell payload 324 and 5 bytes of header information in cell header 322. Within network element 108, cell 320 is provided with an additional 7 byte internal header 326 for addressing of cell 320 within network element 108. A frame 302 is variable in length and has a beginning of frame marker 304, an end of frame marker 306, a frame payload 310 and a frame header 308. For the purposes of the description of the operation of network element 108, frame 302 will be referred to as frame packet 302, beginning of frame header 304 as beginning of packet header 304, end of frame header 306 as end of packet header 306, frame header 308 as packet header 308 and frame payload 310 as packet payload 310.

Network element 108 processes traffic flows using cells 320. Variable length frame packets 302 are processed by segmenting frame packets 302 into cells 320 for internal switching or routing in fabric 206. Cells 320 are assembled, after internal switching or routing, into frame packets 302 before leaving network element 108.

FIG. 3A illustrates the segmentation of a frame packet 302 into cells 320. The group of cells 320(1), 320(2) . . . 320(*x*) that are segmented from a frame packet 302 will be referred to collectively as a cell packet 300 for the purposes of this specification. It will be appreciated that other terms may be used such as RFC1483 encapsulated data. A cell packet 300 has a group of cells 320(1), 320(2) . . . 320(*x*), each cell 320 having a cell header 322, a cell payload 324 and internal header 326.

At ingress to network element 108, ingress card 202 receives a frame packet 302 from a frame-based traffic flow. Ingress card 202 queues frame packets 302 from a traffic flow into at least one segmentation queue. It will be appreciated that frame packets 302 from a traffic flow may be routed onto different segmentation queues creating new traffic flows into the fabric 206. The segmentation queue to use is determined by doing a lookup on the contents of the packet header 308. Upon receiving frame packet 302, as indicated by receipt of end of packet marker 306 in the segmentation queue, ingress card 202 segments frame packet 302 into cells 320.

When forming cells 320 from frame packet 302, packet header 308 is used to create cell headers 322(1), 322(2), . . . 322(x) to provide appropriate addressing for cells 320. The actual packet header is placed inside the payload of the first cell 322(1). Ingress card 202 adds internal header 326 to each cell 320 to provide addressing information within network element 108. Ingress card 202 also segments packet payload 310 of frame packet 302 into payload segments 312(1), 312(2), . . . 312(x) which are formed into cell payloads 324(1), 324(2), . . . 324(x) of cells 320(1), 320(2), . . . 320(x) respectively, shown by arrows 316(1), 316(2), . . . 316(x). Each payload segment 312(1), 312(2), . . . 312(x-1) contains 48 bytes of data from packet payload 310. The final payload segment 312(x) of packet payload 310 contains up to 48 bytes of data which is formed into cell payload 324(x) of cell 320(x) with a filler portion 314. Filler portion 314 has a length of 0–47 bytes and pads cell payload 324(x) to 48 bytes to fill the data field of cell 320(x). It will be appreciated that filler portion 314 does not exist in cell payload 324(x) when payload segment 312(x) is 48 bytes in length.

It will be appreciated that frame traffic flows do not always arrive at a network element 300 in frame packets 302. For example, for ATM interfaces, frame traffic flows arrive in concatenated cell mode. In such a case, network element 300 adds internal header 326 to form cells 320.

Ingress card 202 transmits cells 320 of cell packet 300 to fabric 206 over a packet stream in link 212. A packet stream comprises a multiplexed set of serial cells 320 which are transmitted from an ingress card 202 to the fabric 206. Cells 320 are transmitted on a cell-by-cell basis in network element 108 in the same packet stream, i.e. one cell from a cell packet 300 at a time. Therefore fabric 206 may receive cells 320 from different cell packets 300 interleaved with one another in the packet stream.

Figure 3B:
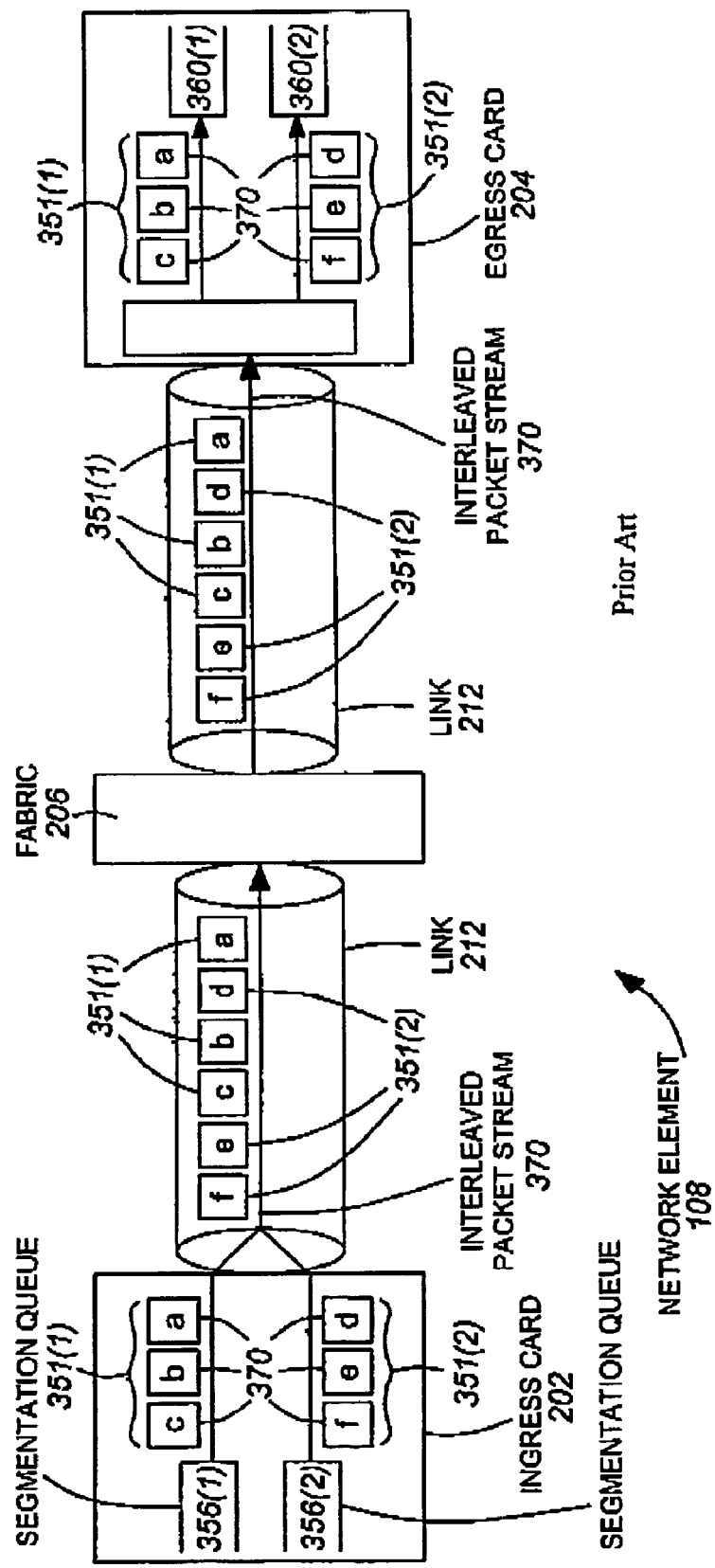
FIG. 3B is a block diagram illustrating an example of transmission of cells through the network element of FIG. 1.

Referring to FIG. 3B, an example of interleaving of cells 320 in an interleaved packet stream 370 is illustrated. Ingress card 202 has segmentation queues 356(1) and 356(2) transmitting two different traffic flows into fabric 206. A cell packet 351(1) exiting segmentation queue 356(1) has cells 320(a), 320(b) and 320(c). A cell packet 351(2) exiting segmentation queue 356(2) has cells 320(d), 320(e) and 320(f). Cells 320(a)–(f) are transmitted to fabric 206 on a cell-by-cell basis in interleaved packet stream 370. As can be seen from FIG. 3B, cells 320 from cell packet 351(1) are interleaved in interleaved packet stream 370 with cells 320 from cell packet 351(2).

Fabric 206 transmits cells 320 of cell packet 300 to the appropriate egress card 204 over an interleaved packet stream 370 in link 212 on a cell-by-cell basis resulting in interleaving of cells 320 as shown in FIG. 3B. Egress card 204 of network element 108 queues cells 320 from a traffic flow in a reassembly queue 360 prior to assembly into frame packet 302. The reassembly into frame packet 302 occurs only when the egress interface is a frame interface. If the egress interface operates on a cell basis (such as an ATM interface), no assembly into a frame packet 302 is required. Internal header 326 of cell 320 contains information used by egress card 204 to queue cell 320 in the proper reassembly queue 360. Egress card 204 assigns separate reassembly queues 360 for each traffic flow, for example, reassembly queue 360(1) for cells 320 from segmentation queue 356(1) and reassembly queue 360(2) for cells 320 from segmentation queue 356(2). This results in uninterleaving of cells 320 from different cell packets 300, such as the uniterleaving of cell packet 351(1) from cell packet 351(2) shown in FIG. 3B, when sending cells 320 to reassembly queues 360.

Once all cells 320 of cell packet 300 are received in the reassembly queue 360, egress card 204 strips off internal headers 326 and cell headers 322 and maps the information contained back into packet header 308. Egress card 204 reassembles cell payloads 324(1), 324(2), . . . and 324(x) into packet payload 310 and replaces beginning of packet marker 304 and end of packet marker 306. Egress card 204 then transmits the assembled frame packet 302 out of network element 108. Again, this assembly into frame packet 302 does not apply if the egress interface operates on cell basis.

Network element 108 uses a custom integrated circuit (IC) in egress card 204 to provide data storage for separate reassembly queues 360 for up to 128,000 traffic flows. This IC provides a physical limitation to the number of queues available for network element 108.

2.0 System Architecture and Operation of the Network Element of the Embodiment

Figure 4A:
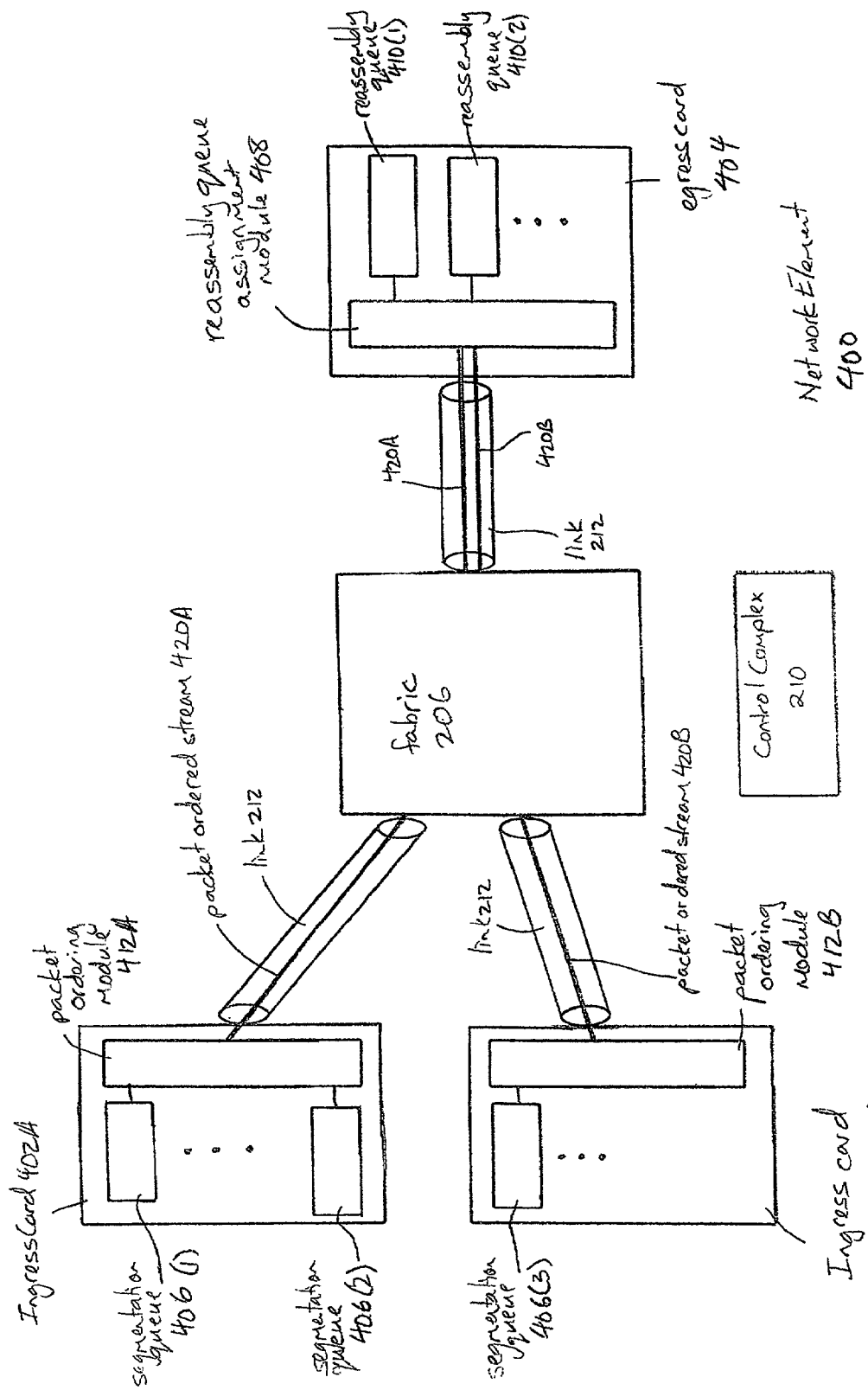
FIG. 4A is a block diagram of components of a network element embodying the invention.

Referring to FIG. 4A, the system architecture and the general operation of network element 400 of the embodiment is similar as that illustrated in FIGS. 1–3 in relation to the prior art. Network element 400 of the embodiment differs from network element 108 in the functionality and operation of its line cards, specifically ingress cards 402 and egress cards 404.

In network element 400 of the embodiment, egress card 404 reuses reassembly queue 410 for a number of traffic flows, reducing the number of reassembly queues 410 required. The egress card 404 of the embodiment uses a Field Programmable Gate Array (FPGA) to implement the data storage for the assembly queues required for up to 128,000 traffic flows. Due to the limitations of FPGA technology, the device only provides 3072 reassembly queues. This is not adequate to provide a separate reassembly queue for all 128,000 traffic flows using the prior art shown in FIG. 3B. The embodiment overcomes this limitation as described below.

Additionally, network element 400 of the embodiment provides traffic guarantees for traffic flows through network element 400 at ingress card 402. Ingress card 402 provides a traffic flow with bandwidth of link 212 into fabric 206 corresponding to a weight assigned to the traffic flow into ingress card 402.

Detail of the queues of ingress cards 402 and an egress card 404 of network element 400 is provided in FIG. 4A. Ingress cards 404 have a segmentation queue 406 for each traffic flow into network element 400 and a packet ordering module 412. Egress cards 404 have reassembly queue assignment module 408 and reassembly queues 410.

As with the prior art, frame-based traffic flows arrive at ingress cards 402A and 402B in network element 400 from various connected CPEs (not shown). Frame packets 302 are queued in segmentation queues 406(1), 406(2) and 406(3). FIG. 4A illustrates two traffic flows into ingress card 402A and one traffic flow into ingress card 402B, respectively. Ingress card 402A segments frame packets 302 from the traffic flows into cells 320. Instead of sending cells 320 individually on a cell-by-cell basis into fabric 206 as in the prior art, cells 320 of a cell packet 300 are sent to packet ordering module 412A. Packet ordering modules 412 are hardware resources that software on ingress card 402 controls and assigns to a segmentation queue 406. Packet ordering module 412A sends all cells 320 of a cell packet 300 from a segmentation queue 406 in a packet ordered stream 420 over link 212 into fabric 206.

It will be appreciated that frame traffic flows do not always arrive at a network element 400 in frame packets 302. For example, for ATM interfaces, frame traffic flows arrive in concatenated cell mode where one or more cells belong to a cell packet. In such a case, network element 400 adds internal header 326 to form cells 320 and sends them to their assigned packet ordering module 412. As with cells 320 from segmentation queues 406, packet ordering module 412 sends all cells 320 of a cell packet 300 in a packet ordered stream 420 over link 212 into fabric 206.

A packet ordered stream 420 comprises a multiplexed set of serial cells 320 which are transmitted from ingress card 402 to fabric 206. It differs from interleaved packet stream 370 in that all of the cells 320 from a cell packet 300 are transmitted over packet ordered stream 420 in sequential order with no intervening cells 320 from other cell packets 300 from ingress card 402. This format eliminates interleaving of cells 320 from cell packets 300 from different segmentation queues 406 in ingress card 402, for example from segmentation queues 406(1) and 406(2), in link 212.

Fabric 206 transmits cells 320 to the appropriate egress card 404 over link 212 on a cell-by-cell basis. Cells 320 from a cell packet 300 in link 212 to egress card 404 may be interleaved with those from cell packets 300 from other ingress cards 402. Egress card 404 receives cells 320 at reassembly queue assignment module 408. Reassembly queue assignment module 408 examines internal header 326 of cells 320 received to identify their connection identifier. Each cell 320 is then queued by reassembly queue assignment module 408 in reassembly queue 410 corresponding to its connection identifier (CI), which contains connection and source information about the cell and is stored in a field in the header. In particular, the connection identifier of a cell 320 indicates the ingress card 402 from which the cell 320 originated since this is used on initiation of the datapath connection to define the relationship of connection identifier to reassembly queue 410. Further detail on aspects of the connection identifier are provided later. Therefore, traffic flows originating from segmentation queues 406(1) and 406(2) in ingress card 402A and transmitted to egress card 404 are queued in the same reassembly queue 410, for example reassembly queue 410(1). Similarly, a traffic flow from ingress card 402B transmitted to egress card 404 is queued in a different reassembly queue 410, for example reassembly queue 410(2), by reassembly queue assignment module 408.

Because cells 320 are not interleaved from different segmentation queues 406 in an ingress card 402, cells 320 of each cell packet 300 arriving at reassembly queue 410 are in sequential order and are grouped together. Accordingly, in reassembling a frame packet 302, assembly queue 410 can anticipate that sequential cells 320 are associated either with the current frame packet 302 or the next frame packet 302. As such, reassembly queue 410 does not have to order and group cells 320 before reassembling them into frame packets 320. In the prior art, this ordering and grouping was accomplished by separately queuing each traffic flow, in effect uninterleaving cells 320 into separate reassembly queues. Accordingly, egress card 404 both avoids the necessity for ordering and grouping cells 320 and provides reuse of reassembly queues 410 by transmitting cells 320 in packet ordered streams 420 and queuing cells 320 from the same ingress card 402 in the same reassembly queue 410. Egress card 404 reassembles frame packets 302 from the queued cells 320 in assembly queues 410 and transmits the reassembled frame packets 302 out of network element 400 as described previously.

Figure 4B:
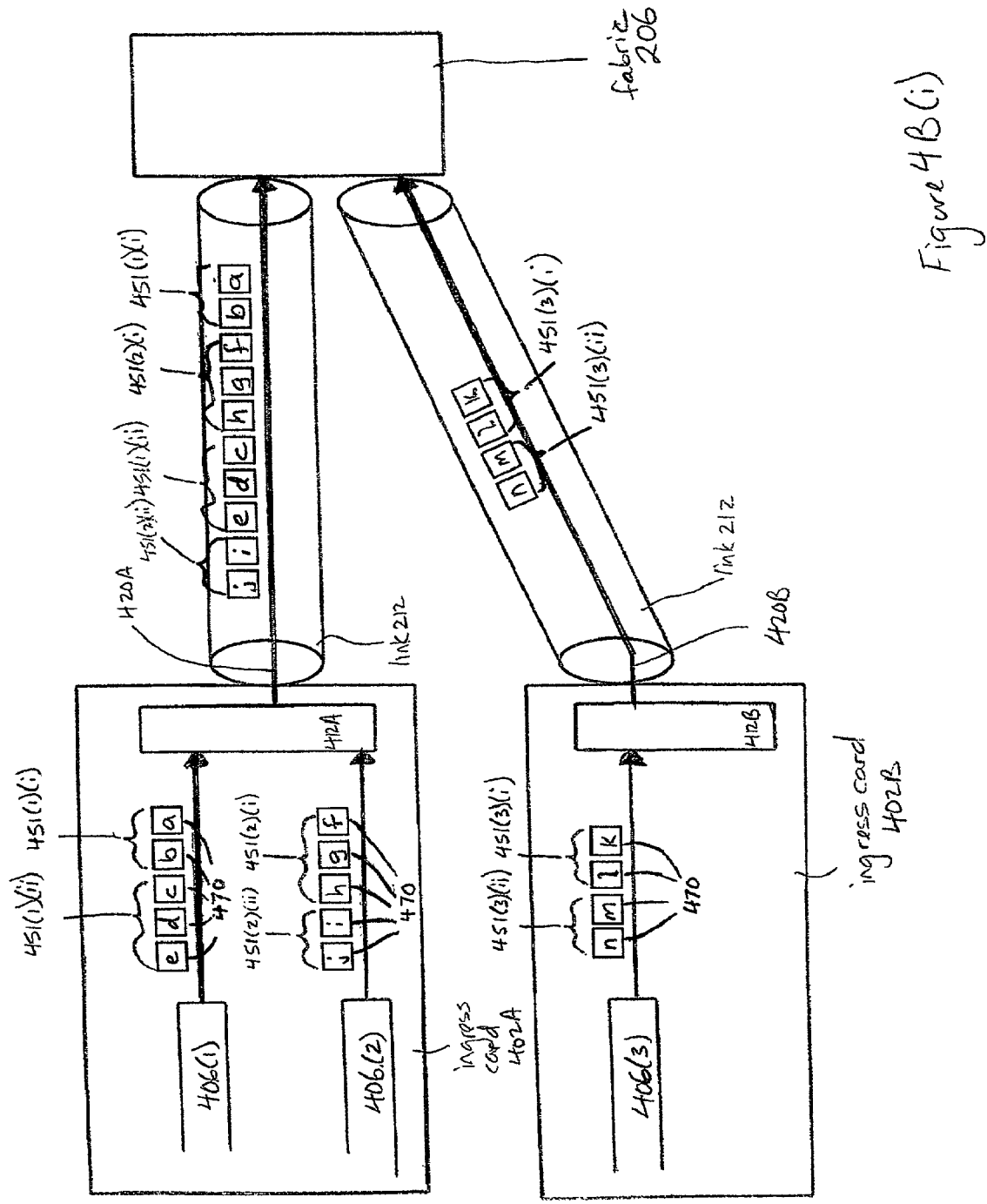
FIG. 4B($i$) is a block diagram illustrating an example of transmission of cells from ingress cards to a fabric of the network element of FIG. 4A.

Referring to FIGS. 4B(i) and 4B(ii), an example of transmission of cells 470 by the embodiment through network element 400 is illustrated. First referring to FIG. 4B(i), in ingress card 402A, cell packets 451(1)(i) and 451(1)(ii) exiting segmentation queue 406(1) comprise cells 470(a) and 470(b) and cells 470(c), 470(d) and 470(e), respectively. In ingress card 402A, cell packets 451(2)(i) and 451(2)(ii) exiting segmentation queue 406(2) comprise cells 470(f), 470(g) and 470(h) and cells 470(i) and 470(j), respectively. In ingress card 402B, cell packets 451(3)(i) and 451(3)(ii) exiting segmentation queue 406(3) comprise cells 470(k) and 470(l) and cells 470(m) and 470(n), respectively. The cells 470 of the cell packets 451 are provided to their respective packet ordering modules 412A and 412B.

For ingress card 402A, packet ordered stream 420A is generated from packet ordering module 412A, wherein cells 470 from cell packets 451 are grouped sequentially together with no intervening cells 470 between sequential cells 470 from one cell packet 451. Similarly, all cells 470 from each cell packet 451 in ingress card 402B are transmitted over packet ordered stream 420B in sequential order with no intervening cells 470 from other cell packets 451.

Referring now to FIG. 4B(ii), cells 470 from cell packets 451 from ingress card 402A may have intervening cells 470 from cell packets 451 from ingress card 402B, as described above as transmission of cells 470 through fabric 206 is performed on a cell-by-cell basis and not on a cell packet basis. This is shown in relation to cell packet 451(1)(i) which has an intervening cell 470(k) between its cells 470(a) and 470(b). Cells 470(a) and 470(b) are from ingress card 402A while cell 470(k) is from ingress card 402B. Similarly, cell packet 451(2)(i) has an intervening cell 470(l) between its cells 470(g) and 470(h). However, cells 470 from cell packets 451 from ingress card 402A are not interleaved with one another because packet ordering module 412A releases cells 470 sequentially without interleaving cells 470 from differing segmentation queues 406 in ingress card 402A. Similarly, cells 470 from different cell packets 451 from ingress card 402B are not interleaved with one another.

In egress card 404, reassembly queue assignment module 408 examines cells 470 as described above. Since cells 470(a), 470(b), 470(f), 470(g) and 470(h) are from ingress card 402A, these cells 470 are sent to the same reassembly queue 410(1). Reassembly queue assignment module 408 routes the intervening cells 470(k) and 470(l) to reassembly queue 410(2) as this reassembly queue 410 has been assigned to ingress card 402B. As can be seen from FIG. 4B(ii), this results in the grouping of cell packets 451 in reassembly queues 410.

Figure 5A:
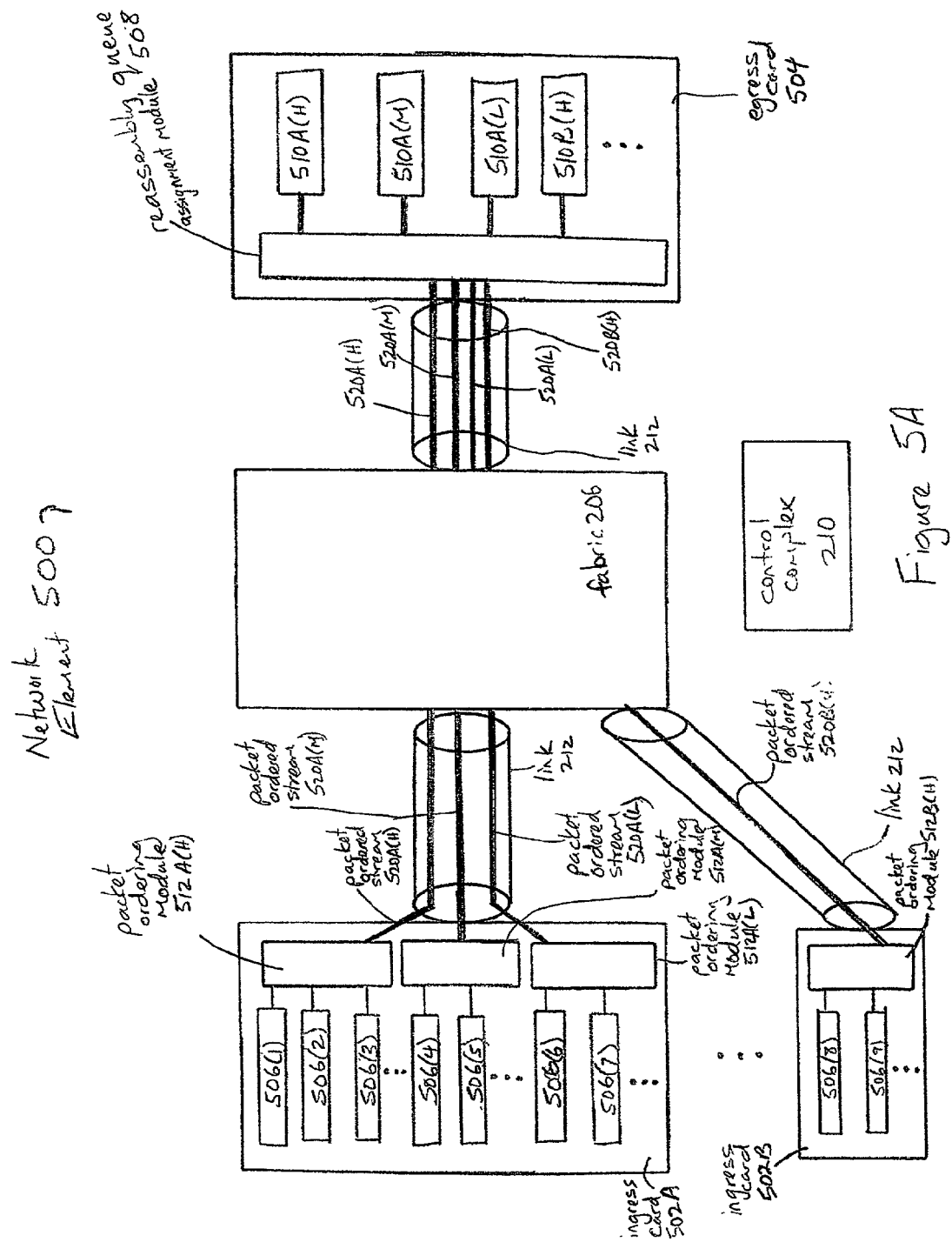
FIG. 5A is a block diagram of components of a network element comprising another embodiment of the invention.

Referring to FIG. 5A, another embodiment of the invention is provided. FIG. 5A shows ingress card 502A in network element 500 having segmentation queues 506(1), 506(2), . . . 506(7) and packet ordering modules 512A(H), 512A(M) and 512A(L) and ingress card 502B in network element 500 having segmentation queues 506(8) and 506(9) and packet ordering module 512B(H).

A traffic flow of the embodiment may be assigned a priority, such as high (H), medium (M) and low (L). A user can configure the priority given to a type of traffic flow or a particular traffic flow through network element 500 by communicating with control complex 210. Upon establishing a connection in network element 500, described later, the priority of the traffic flow is used to send output from a segmentation queue 506 to the appropriate packet ordering module 512. A frame packet 302 arriving at ingress card 502 is routed to its assigned segmentation queue 506, as described earlier. The priority of the particular frame packet 302 is determined by the priority of the traffic flow to which it belongs.

In ingress card 502, cells 320 from segmentation queues 506 are sent to their associated packet ordering module 512. For example, in ingress card 502, cells 470 from segmentation queues 506(1), 506(2) and 506(3) for traffic flows with high priority are sent to packet ordering module 512A(H). Packet ordering module 512A(H) sends all cells 320 of a cell packet 300 from a connected segmentation queue 506 over link 212 in a packet ordered stream 520A(H) with no intervening cells 320 from other segmentation queues 506.

As with network element 400, frame traffic flows do not always arrive at a network element 500 in frame packets 302. In such a case, network element 300 adds internal header 326 to form cells 320 and sends cells 320 to their assigned packet ordering module 512. As with cells 320 from segmentation queues 506, packet ordering module 512 sends all cells 320 of a cell packet 300 in a packet ordered stream 520 over link 212 into fabric 206 with no intervening cells 320 from other segmentation queues 506.

Cells 320 from segmentation queues 506(4) and 506(5) for traffic flows with medium priority are sent to packet ordering module 512A(M). Packet ordering module 512A(M) sends all cells 320 of a cell packet 300 from a connected segmentation queue 506 over link 212 in a packet ordered stream 520A(M) with no intervening cells 320 from other segmentation queues 506.

Cells 320 from segmentation queues 506(6) and 506(7) for traffic flows with low priority are sent to packet ordering module 512A(L). Packet ordering module 512A(L) sends all cells 320 of a cell packet 300 from a connected segmentation queue 506 over link 212 in a packet ordered stream 520A(L) with no intervening cells 320 from other segmentation queues 506.

Packet ordered streams 520A(H), 520A(M) and 520A(L) are transmitted from ingress card 502A over link 212 into fabric 206 on a cell-by-cell basis. Therefore, cells 320 from a cell packet 300 may be interleaved in link 212 with cells 320 from a cell packet 300 from a different packet ordered stream 520A.

For ingress card 502B, cells 320 from segmentation queues 506, for example, segmentation queues 506(8) and 506(9), for traffic flows in ingress card 502B with a high priority are sent to packet ordering module 512B(H). Packet ordering module 512B(H) sends all cells 320 of a cell packet 300 from a connected segmentation queue 506 over link 212 in a packet ordered stream 520B(H) with no intervening cells 320 from other segmentation queues 506. Packet ordered stream 520B(H) is transmitted from ingress card 502B over its link 212 into fabric 206 on a cell-by-cell basis.

Cells 320 from packet ordered streams 520A(H), 520A(M), 520A(L) and 520B(H) are transmitted from fabric 206 to the appropriate egress card 504, in this example the same egress card 504, over link 212 on a cell-by-cell basis. Therefore cells 320 from different packet ordered streams 520 from different ingress cards 502 or with different priorities may be interleaved in link 212.

At egress card 504, reassembly queue assignment module 508 examines internal header 326 of cells 320 received to determine the connection identifier. The connection identifier identifies which ingress card 502 transmitted them and the priority of the traffic flow to which they belong. Reassembly queue assignment module 508 queues cells 320 in a separate reassembly queue 510 for every priority level of every ingress card 502. For example, cells 320 from ingress card 502A having high priority, i.e. from packet ordered stream 520A(H), are sent to a reassembly queue 510A(H). Meanwhile, cells 320 from ingress card 502A having medium priority, i.e. from packet ordered stream 520A(M), are sent to a reassembly queue 510A(M) and cells 320 from ingress card 502B having high priority, i.e. from packet ordered stream 520B(H), are sent to a reassembly queue 510B(H).

Because cells 320 are not interleaved from different segmentation queues 506 having the same priority in an ingress card 502, cells 320 arriving at a reassembly queue 510 are in sequential order and are grouped into cell packets 300. Egress card 504 reassembles frame packets 302 from the queued cells 320 in reassembly queues 510 and transmits the reassembled frame packets 302 out of network element 500 as described previously.

Splitting the traffic flows into 3 separate packet ordered streams improves the traffic management capabilities of network element 500. If congestion is experienced on the egress card 504 or the fabric 206, the ingress card 502 has the ability to prioritize among traffic flows. During congestion, the ingress card 502 will service traffic faster from the high priority packet ordering module 512 than from the medium or low priority packet ordering modules. This allows the ingress card 502 to make bandwidth guarantees for the high priority traffic flows. The fabric 206 will also prioritize traffic according to the 3 priorities.

Figure 5B:
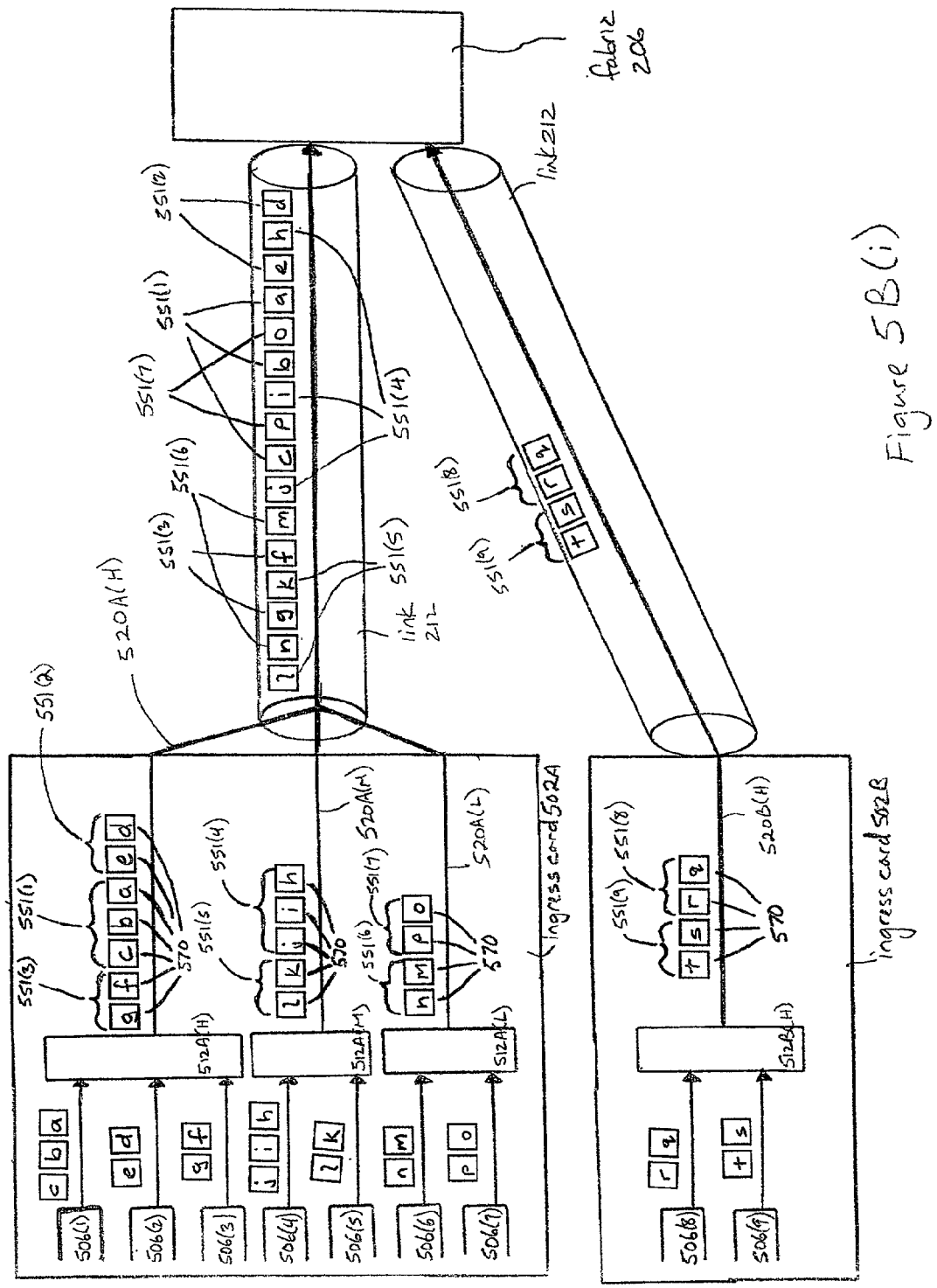
FIG. 5B($i$) is a block diagram illustrating an example of transmission of cells from an ingress cards to a fabric of the network element of FIG. 5A.

Referring to FIGS. 5B(*i*) and 5B(*ii*), an example of transmission of cells 570 in packet ordered streams 520 of FIG. 5A is illustrated. Referring to FIG. 5B(*i*), segmentation queues 506(1), . . . 506(9) output cell packets 551 comprising the following cells 570 as provided in the following table:

| Segmentation Queue | Cell Packet | Cells |
|---|---|---|
| 506(1) | 551(1) | 570(a), 570(b) and 570(c) |
| 506(2) | 551(2) | 570(d) and 570(e) |
| 506(3) | 551(3) | 570(f) and 570(g) |
| 506(4) | 551(4) | 570(h), 570(i) and 570(j) |
| 506(5) | 551(5) | 570(k) and 570(l) |
| 506(6) | 551(6) | 570(m) and 570(n) |
| 506(7) | 551(7) | 570(o) and 570(p) |
| 506(8) | 551(8) | 570(q) and 570(r) |
| 506(9) | 551(9) | 570(s) and 570(t) |

As described earlier, all cells 570 from each cell packet 551 with high priority are transmitted over packet ordered stream 520A(H) in sequential order with no intervening cells 570 from other cell packets 551. This is illustrated in packet ordered stream 520A(H) from ingress card 502A where cells 570 from cell packets 551 are grouped together. Similarly, all cells 570 from each cell packet 551 in ingress card 502A with medium priority are transmitted over packet ordered stream 520A(M) in sequential order with no intervening cells 570 from other cell packets 551. Also, all cells 570 from each cell packet 551 in ingress card 502A with low priority are transmitted over packet ordered stream 520A(L) in sequential order with no intervening cells 570 from other cell packets 551. As described previously with respect to FIG. 5A, a cell packet 551 may have intervening cells 570 from other packet ordered streams 520 in link 212 to fabric 206.

The above description for interleaved cells 570 in link 212 from ingress card 502A is also applicable to cell packets 551 in link 212 from ingress card 502B.

Referring now to FIG. 5B(ii), cells 570 from cell packets 551 from ingress card 502A transmitted from fabric 206 to egress card 504 in link 212 may also have intervening cells 570 from cell packets 551 from ingress card 502B, as described above. This is shown in relation to cell packet 551(1) in link 212 which has an intervening cell 570(q) between its cells 570(a) and 570(b). Cells 570(a) and 570(b) are from ingress card 502A with high priority while cell 570(q) is from ingress card 502B with high priority.

At egress card 504, reassembly queue assignment module 508 at egress card 504 examines the internal header of cells 570 to determine the connection identifier that identifies which ingress card 502 transmitted them and the priority of the traffic flow to which they belong. Since cells 570(a), 570(b), 570(c), 570(d) and (e) are from ingress card 502A and a traffic flow with high priority, these cells 570 are sent to the same reassembly queue 510A(H). Reassembly queue assignment module 508 routes the intervening cells 570(h) and 570(i) to reassembly queue 510A(M) as this reassembly queue 510 has been assigned to ingress card 502A for cells 570 from a traffic flow with medium priority. Reassembly queue assignment module 508 routes the intervening cells 570(o) and 570(p) to assembly queue 510A(L) as this reassembly queue 510 has been assigned to ingress card 502A for cells 570 from a traffic flow with low priority. Finally, reassembly queue assignment module 508 routes the intervening cell 570(q) to reassembly queue 510B(H) as this reassembly queue 510 has been assigned to ingress card 502B for cells 570 from a traffic flow with high priority. As can be seen from FIG. 5B(ii), this results in the grouping of cell packets 551 in reassembly queues 510.

3.0 Establishing Connections in the Network Element of the Embodiment

The following section describes the mechanics of establishing connections for traffic flows in a network element of the embodiment to process and direct cells 320 from those traffic flows using the embodiment.

Figure 6:
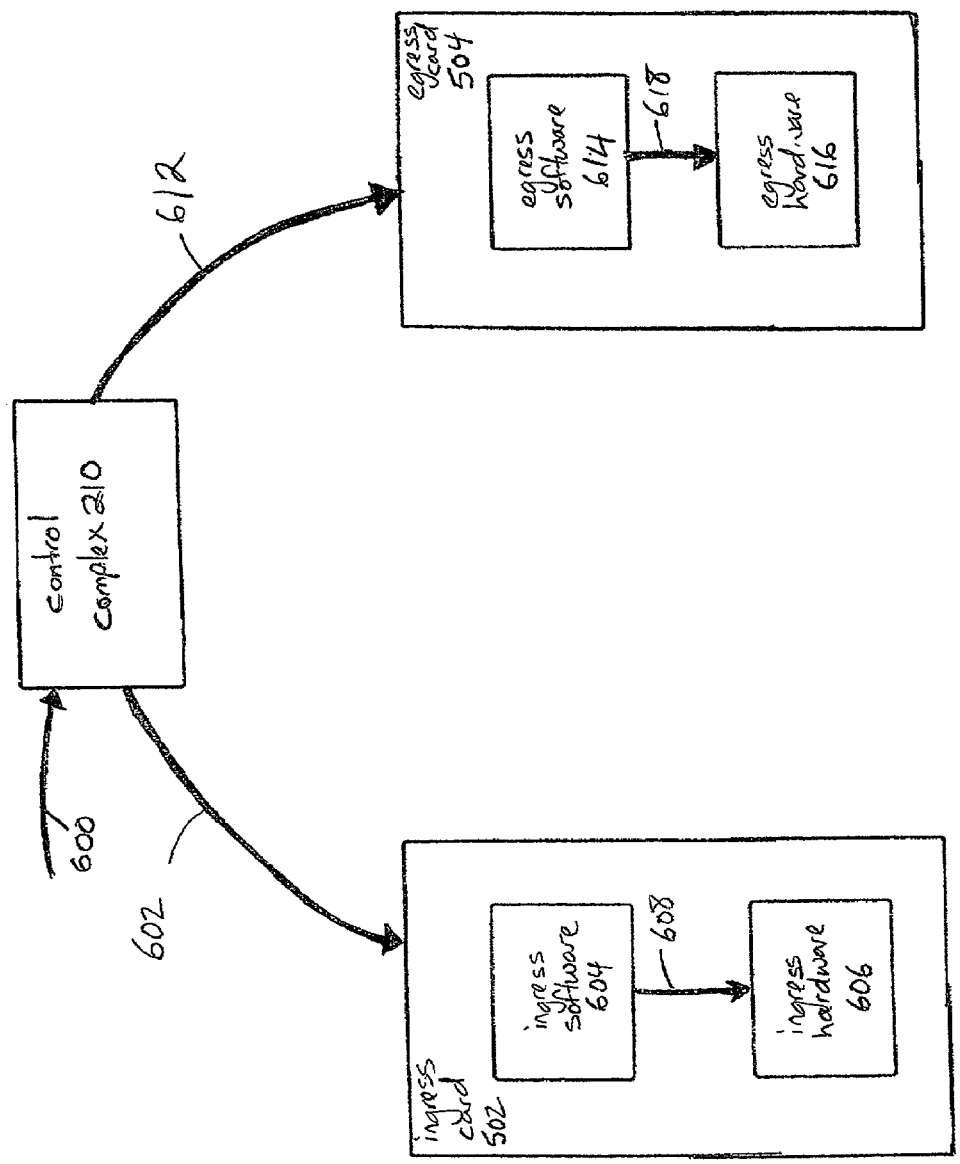
FIG. 6 is a block diagram of configuring datapath connections in the network element of FIG. 5A.

Referring to FIG. 6, an illustration of the interactions of control complex 210 with ingress card 502 and egress card 504 when establishing connections is provided. Establishing connections in network element 500 is described below in relation to the embodiment of network element 500 illustrated in FIG. 5A. It will be appreciated that establishing connections in network element 400 illustrated in FIG. 4A is provided in a similar manner.

Ingress card 502 of network element 500 has ingress software 604 and ingress hardware 606. Ingress hardware 606 includes segmentation queues 506, the memory that is used for segmentation queues 506 and packet ordering modules 512. Egress card 504 of network element 500 has egress software 614 and egress hardware 616. Egress hardware includes the reassembly queues 510, the memory that is used for reassembly queues 510 and reassembly queue assignment module 508.

Control complex 210 establishes a connection for a traffic flow through network element 500 when it receives a message from another network element or device connected to network element 500, indicated by arrow 600, that a connection through network element 500 is desired for a traffic flow. The message may be signaled to network element 500 or be generated by an operator manually configuring the connection as is known in the art. It contains priority information that allows control complex 210 to assign the priority desired for the traffic flow. To establish the connection, control complex 210 first assigns a connection identifier for this traffic flow and then sends an initialization message to ingress card 502 for the traffic flow, indicated by arrow 602. This message contains the identity of the egress card 504, the priority desired and the newly assigned connection identifier. Information in the connection identifier is used by the embodiment to track priority, queuing and other aspects of messages and their associated queues.

Ingress card 502 receives the initialization message which triggers ingress software 604 to allocate memory from ingress hardware 606, indicated by arrow 608, to define a segmentation queue 506 to the traffic flow. Ingress software 604 then determines which packet ordering modules 512 have been assigned to segmentation queues 506 in ingress card 502. The management of packet ordering modules 512 of ingress card 502 is implemented in ingress software 604. Ingress software 604 allocates packet ordering modules 512 in ingress card 502 to segmentation queues 506 as traffic flows are initialized. Ingress card 502 allocates a new packet ordering module 512 in response to the message from control complex 210 only if a packet ordering module 512 for that particular priority in ingress card 502 to the specified egress card 504 has not yet been assigned. Otherwise, ingress software 604 will assign the existing packet ordering module 512 for the specified priority and egress card 504 to receive output from this segmentation queue 506.

Control complex 210 also sends a second initialization message to egress card 504, indicated by arrow 612, to establish the new connection for the traffic flow. This second initialization message contains the identity of the ingress card 502, the priority desired and the newly assigned connection identifier.

Egress software 614 determines if a connection has already been established with this same ingress card 502 and priority combination. If a connection for this combination has not yet been established, egress software 614 configures egress hardware 616, indicated by arrow 618, to assign a reassembly queue 510 for cells 320 arriving with this connection identifier. If a connection for this combination exists, egress software 614 configures the previously assigned reassembly queue 510 for this combination to receive cells 320 associated with this connection identifier. Finally, the reassembly queue assignment module 508 is programmed with the connection identifier to reassembly queue relationship. It will be appreciated that there are a number of methods to map the connection identifier of an incoming cell 320 to the correct reassembly queue 510. One method is to have a table in reassembly queue assignment module 508 which maps the associated reassembly queue 510 for the connection identifier. Using this mapping scheme, it is also possible to have a set of reassembly queues 510 being associated with a particular connection identifier. Members from the set may be assigned to a cell 320 on a round-robin basis, or other assignment schemes known in the art.

After the connection identifier is used to establish the route for all traffic associated with it, processing of cells associated by the connection identifier can be performed. When a frame packet 302 arrives at ingress card 502, the context label or address identifying the traffic flow is contained in packet header 308. Ingress hardware 606 at ingress card 502 uses the context label or address to identify the appropriate segmentation queue 506 for the frame packet 302 as well as to identify the connection identifier for this packet. Ingress card 502 then segments frame packet 302 as described earlier and inserts the connection identifier for the traffic flow into the internal header 326 of each cell 320 of the cell packet 300. Cells 320 are transmitted to the appropriate egress card 504 as described earlier. Egress card 504, upon receiving a cell 320, reads the connection identifier from its internal header 326. Egress hardware 616 uses the connection identifier to queue the cell 320 in its assigned reassembly queue 510.

It will be appreciated that the assigned reassembly queue may be marked in a "queue" field in the header of cell 320 by the reassembly queue assignment module 508.

Figure 7A:
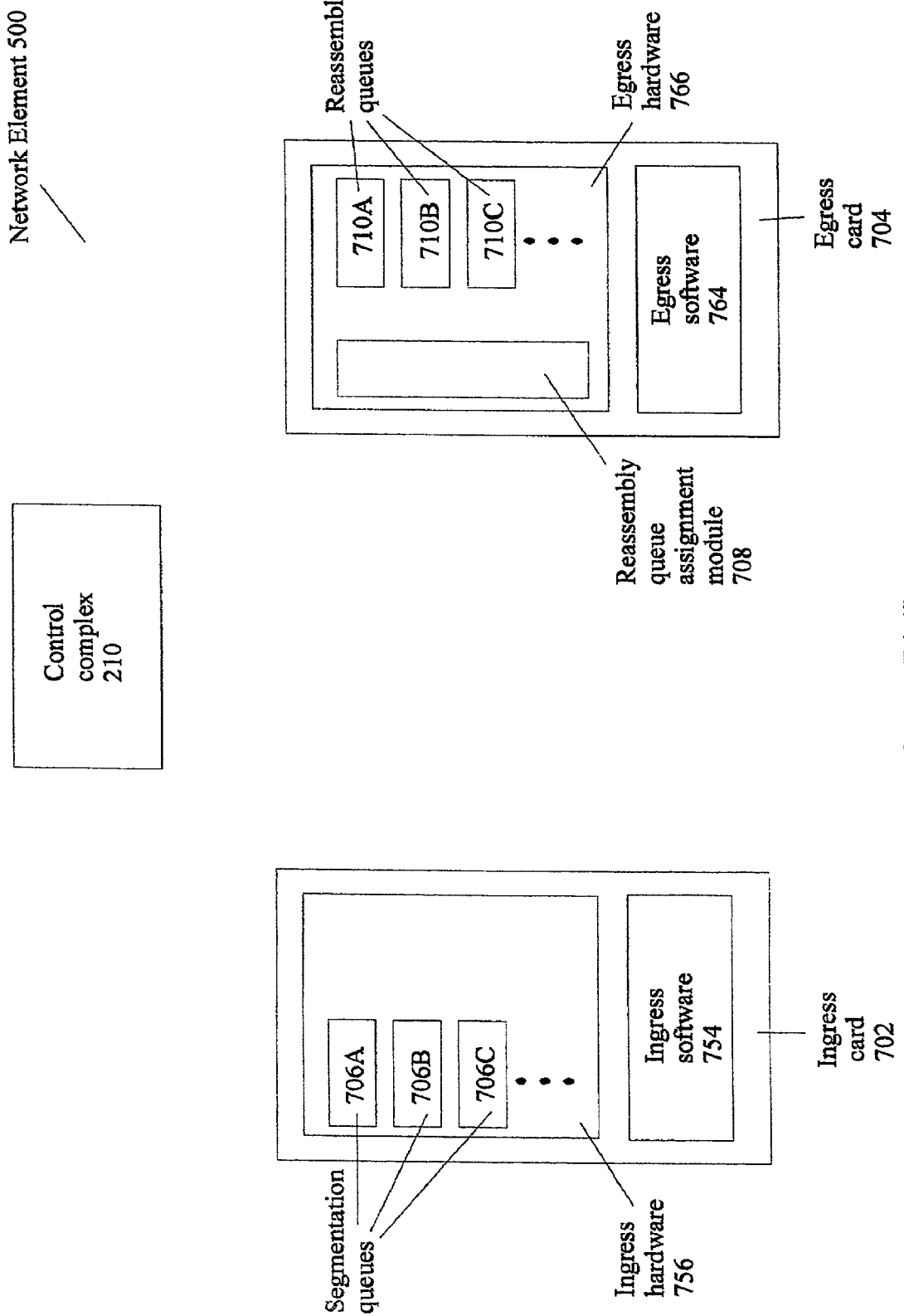
FIG. 7A($i$) is a block diagram exemplary of a network element of FIG. 5A with no datapath connections established.

Referring to FIGS. 7A(i) to 7A(iv), an example of establishing three connections in network element 500 is provided to illustrate the interaction of the hardware and software of its ingress and egress cards. Except where noted, the basic operation of elements introduced in FIG. 7 is similar to corresponding elements in FIG. 6. Accordingly, ingress card 702 is equivalent to ingress card 502 of FIG. 5A. Ingress software 754 is equivalent to ingress software 604 of FIG. 6. Ingress hardware 756 is equivalent to ingress hardware 606 of FIG. 6. Egress card 704 is equivalent to egress card 504 of FIG. 5A. Reassembly queue assignment module 708 is equivalent to reassembly queue assignment module 508 of FIG. 5A. Egress software 764 is equivalent to egress software 614 of FIG. 6. Egress hardware 766 is equivalent to egress hardware 616 of FIG. 6.

Network element 500 begins in FIG. 7A(i) with no connections established. Network element 500 therefore has no assigned segmentation queues 706 and reassembly queues 710 and no programmed packet ordering modules 712.

Referring to FIG. 7A(ii), control complex 210 receives a message 750A that a connection is requested between ingress card 702 and egress card 704 having a high priority, indicated by arrow 738A. The message 750A is generated by signaling or manually configuring the new connection, as is known in the art. Control complex 210 assigns connection identifier 33 to this traffic flow and sends a message 752A including the identity of egress card 704, the connection identifier and the priority of the connection to ingress card 702 to establish this connection, indicated by arrow 740A. Ingress software 754 allocates a packet ordering module 712(H) in ingress hardware 756 and allocates memory from ingress hardware 756 to define a segmentation queue 706A for this connection identifier 33. Segmentation queue 706A is configured by ingress software 754 to send its output to packet ordering module 712(H), indicated by arrow 742A.

Control complex 210 also generates and sends a message 762A, indicated by arrow 744A, to egress card 704 to cause egress card 704 to establish this connection. Message 762A includes the identity of ingress card 702, the connection identifier 33 and the priority for the connection. In response, egress software 764 determines that there has not yet been a reassembly queue 710 assigned for a traffic flow from ingress card 702 with high priority. Therefore, egress software 764 allocates memory from egress hardware 766 to define a reassembly queue 710A for cells 320 arriving with connection identifier 33. Egress software 764 stores the identity of this assembly queue 710 in the hardware reassembly queue assignment module 708. Reassembly queue assignment module 708 will send cells 320 with connection identifier 33 to reassembly queue 710A, indicated by arrow 746A.

Referring to FIG. 7A(iii), control complex 210 receives a message 750B that a connection is requested between ingress card 702 and egress card 704 having medium priority, indicated by arrow 738B. Control complex 210 assigns connection identifier 37 to this traffic flow and sends a message 752B including the identity of egress card 704, the connection identifier and the priority of the connection to ingress card 702 to establish this connection, indicated by arrow 740B. Ingress software 754 allocates a hardware packet ordering module 712(M) and allocates memory from ingress hardware 756 to assign a segmentation queue 706B for this connection identifier 37. Segmentation queue 706B is configured by ingress software 754 to send its output to packet ordering module 712(M), indicated by arrow 742B.

Control complex 210 also sends a message 762B to egress card 704 to establish this connection, indicated by arrow 744B. Message 762B includes the identity of ingress card 702, the connection identifier 37 and the priority of the connection. In response, egress software 764 determines that there has not yet been a reassembly queue 710 assigned for a traffic flow from ingress card 702 having medium priority. Therefore, egress software 764 allocates memory from egress hardware 766 to assign a reassembly queue 710B for cells 320 arriving with connection identifier 37. Egress software 764 stores the identity of this reassembly queue 710 in reassembly queue assignment module 708. Reassembly queue assignment module 708 will send cells 320 with connection identifier 37 to reassembly queue 710B, indicated by arrow 746B.

Referring to FIG. 7A(iv), control complex 210 receives another message 750C that a connection is requested between ingress card 702 and egress card 704 having a high priority, indicated by arrow 738C. Control complex 210 assigns connection identifier 41 to this traffic flow and sends a message 752C to ingress card 702 to establish this connection, indicated by arrow 740C. Message 752C includes the identity of egress card 704, the connection identifier and the priority of the connection. Ingress software 754 does not allocate another packet ordering module 712. Instead, ingress software 754 allocates memory from ingress hardware 756 to define a segmentation queue 706C for this connection identifier 41 and configures segmentation queue 706C to send its output to hardware packet ordering module 712(H), indicated by arrow 742C.

Control complex 210 also sends a message 762C to egress card 704 to establish this connection, indicated by arrow 744C. Message 762C includes the identity of ingress card 702, the connection identifier 41 and the priority of the connection. In response, egress software 764 determines that reassembly queue 710A has already been assigned for a traffic flow from ingress card 702 having high priority. Therefore, egress software 764 defines reassembly queue 710A for cells 320 arriving from connection identifier 41. Egress software 764 stores the identity of the reassembly queue 710A in reassembly queue assignment module 708. Hardware reassembly queue assignment module 708 will send cells 320 with connection identifier 41 to assembly queue 710A, indicated by arrow 746C.

Figure 7B:
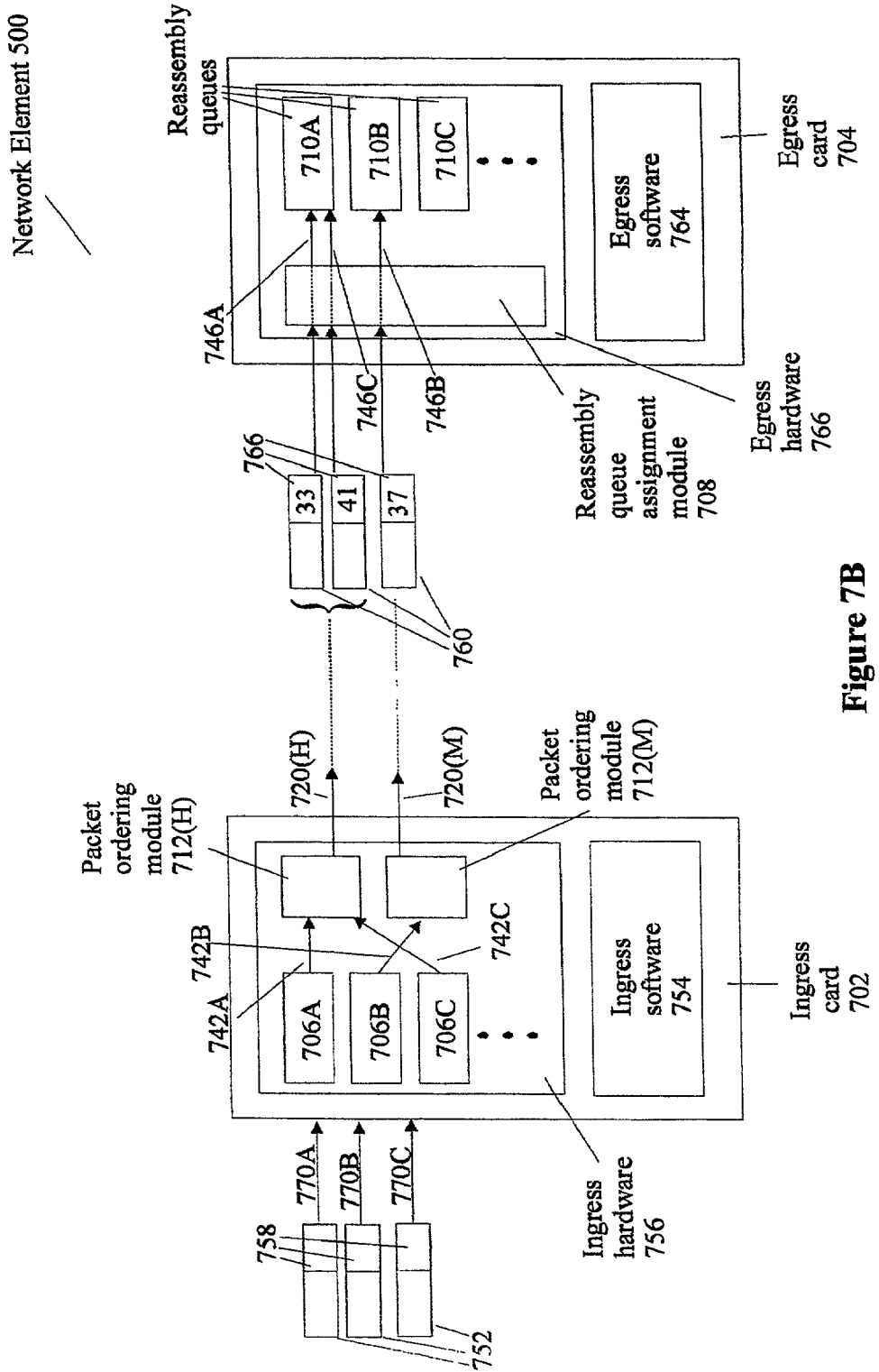
FIG. 7B is a block diagram exemplary of queuing packets from the datapath connections established in FIGS. 7A(*ii*), (*iii*) and (*iv*) in the network element of to FIG. 5A.

Referring to FIG. 7B, an example of queuing frame packets 752 and cell packets 300 from connections established in the example of FIGS. 7A(ii)–(iv) is provided. When a frame packet 752 arrives at ingress card 702, the packet header 758 is examined by hardware to determine the connection identifier, in this case 33. This frame packet 752 is queued in segmentation queue 710A, indicated by arrow 770A. Ingress card 702 then segments frame packet 752 as described earlier and inserts the connection identifier 33 for the traffic flow into the internal header 766 of each cell 760 of their cell packet. Cells 760 are transmitted to packet ordering module 712(H), indicated by arrow 746A. Packet ordering module 712(H) transmits cells 760 to the appropriate egress card 704 over packet ordered stream 720(H), as described earlier.

When a frame packet 752 arrives at ingress card 702, the packet header is examined and the connection identifier 37 is identified with this packet. This frame packet 752 is queued in segmentation queue 710B, indicated by arrow 770B. Ingress card 702 then segments frame packet 752 as described earlier and writes the connection identifier 37 into the internal header 766 of each cell 760. Cells 760 are transmitted to packet ordering module 712(M), indicated by arrow 746B. Packet ordering module 712(M) transmits cells 760 to the appropriate egress card 704 over packet ordered stream 720(M), as described earlier.

When a frame packet 752 arrives at ingress card 702, the packet header 758 is examined and the connection identifier 41 is identified with this packet. This frame packet 752 is queued in segmentation queue 710C, indicated by arrow 770C. Ingress card 702 then segments frame packet 752 as described earlier and writes the connection identifier 41 into the internal header 766 of each cell 760. Cells 760 are transmitted to packet ordering module 712(H), indicated by arrow 746C. Packet ordering module 712(H) transmits cells 760 to the appropriate egress card 704 over packet ordered stream 720(H), as described earlier.

Reassembly queue assignment module 708 in egress card 704, upon receiving a cell 760, reads the connection identifier from its internal header 766. Reassembly queue assignment module 708 routes cells 760 with connection identifier 33 into reassembly queue 710A, indicated by arrow 742A. Reassembly queue assignment module 708 routes cells 760 with connection identifier 37 into reassembly queue 710B, indicated by arrow 742B. Reassembly queue assignment module 708 routes cells 760 with connection identifier 41 into reassembly queue 710A, indicated by arrow 742C.

As described previously, reassembly queues and reassembly queue assignment module 410 in FIG. 4A and reassembly queues and reassembly queue assignment module 510 in FIG. 5A are implemented in their respective egress cards 404 and 504 using a FPGA such as the Xilinx XCV1600EFGA860. The FPGA used in the embodiments of network element 400 of FIG. 4 and network element 500 of FIG. 5 support 3072 reassembly queues for up to approximately 128,000 traffic flows in an egress card. Network element 500 of the embodiment of FIG. 5A has up to 128 ingress cards 502, each ingress card 502 supporting three priorities. Therefore, network element 500 uses a maximum of 384 reassembly queues, one for each ingress card 502 and priority combination. This leaves approximately 2600 reassembly queues unused in an egress card 504.

Figure 9:
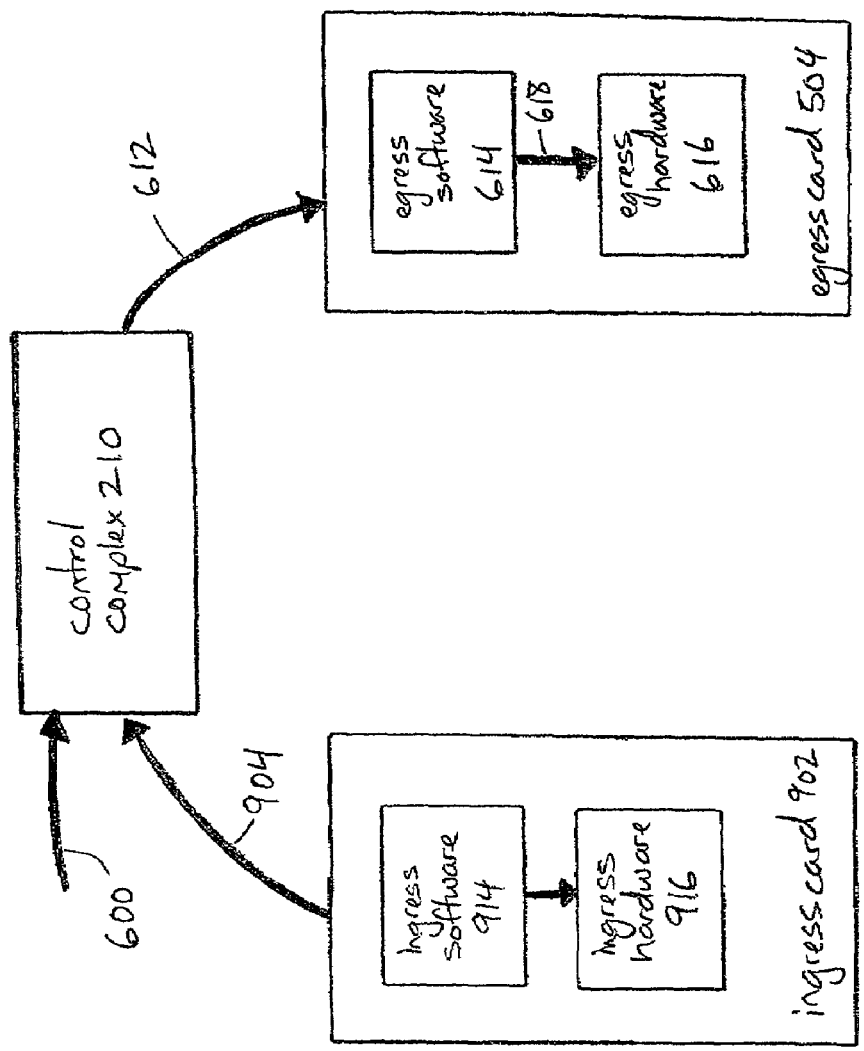
FIG. 9 is a block diagram of connections in a network element of another embodiment of the invention where an ingress card does not support packet ordered streams.

However, an ingress card may not support sending all cells 320 from a cell packet 300 over a packet ordered stream uninterleaved with cells 320 from other cell packets 300, as described above. Referring to FIG. 9, another aspect of an embodiment where an ingress card 902 does not support sending cells 320 over a packet ordered stream is illustrated in relation to network element 900. Network element 900 has the same components as network element 500 of the previously described embodiment except ingress card 902 does not support sending cells 320 over a packet ordered stream. It will be appreciated that support for such ingress cards may be provided to network elements with the same components as network element 400 in a similar manner.

In network element 900, this scenario is processed as follows. Prior to connecting traffic flows through ingress card 902, ingress card 902 informs control complex 210, indicated by arrow 904, that it does not support sending cells 320 on a packet ordered stream. When a message is sent to control complex 210, indicated by arrow 600, to establish a new connection, this connection may be connected to egress card 504 through ingress card 902. As described previously, to establish this connection through this ingress card 902, control complex 210 sends a message to ingress card 902 (not shown). Ingress card 902 establishes connections using ingress software 914 and ingress hardware 916 similar to that of ingress card 502, however, ingress hardware 916 does not include packet ordering modules to send packets to egress card 504 over a packet ordered stream. Control complex 210 also sends a message to egress card 504, indicated by arrow 612 with the identity of the ingress card 902, the connection identifier assigned for this connection and the priority of the connection. This message also includes the information that ingress card 902 does not support sending cells 320 on a packet ordered stream.

In response to this message, egress software 614 allocates memory from egress hardware 616, indicated by arrow 618, to assign a separate reassembly queue 510 for cells 320 arriving with this connection identifier. All traffic flows from this particular ingress card 902 in network element 900 will be assigned a separate reassembly queue 510 by the reassembly queue assignment module, as in the prior art. Therefore, the remaining approximately 2600 unused reassembly queues 510 in an egress card 504 may be assigned to traffic flows from ingress cards 902 that do not support sending cells 320 on a packet ordered stream.

4.0 Traffic Guarantees in Packet Ordered Streams

Figure 8:
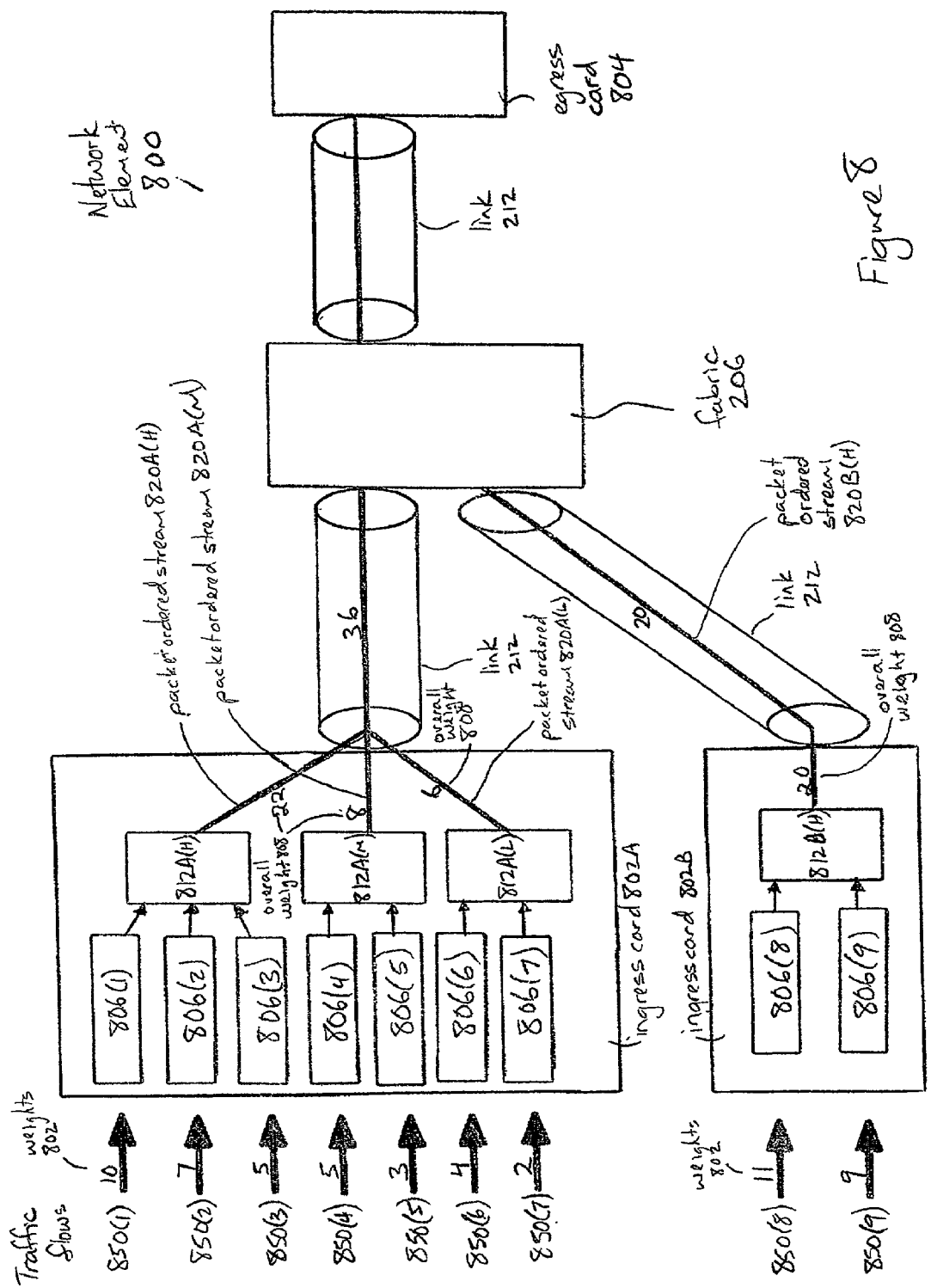
FIG. 8 is a block diagram illustrating an exemplary allocation of bandwidth to packet ordered streams in a network element of another embodiment of the invention.

A network element of the embodiment may also provide traffic guarantees at an ingress card for traffic flows being transmitted through the network element. Referring to FIG. 8, providing traffic guarantees in an ingress card is described below in relation to an embodiment of network element 800 with the same components as network element 500 illustrated in FIG. 5A. It will be appreciated that traffic guarantees in ingress card 402 in network element 400 illustrated in FIG. 4A are provided in a similar manner.

Ingress card 802 provides a traffic flow with bandwidth of its packet ordered stream 820 corresponding to a weight assigned to the traffic flow into ingress card 802. This, in turn, provides a traffic flow with bandwidth of link 212 to fabric 206 corresponding to a weight assigned to the traffic flow into ingress card 802.

Traffic flows 850 in network element 800 are illustrated arriving at ingress cards 802. Traffic flows 850(1), 850(2), . . . 850(7) are shown arriving at segmentation queues 806(1), . . . 806(7) in ingress card 802A respectively. Additionally, traffic flows 850(8) and 850(9) are shown arriving at segmentation queues 806(8) and 806(9) in ingress card 802B respectively. Traffic flows 850(1), 850(2), 850(3), 850(8) and 850(9) have a high priority, traffic flows 850(4) and 850(5) have a medium priority and traffic flows 850(6) and 850(7) have a low priority.

Traffic flows 850 are also assigned a weight 802 to allocate resources of network element 800 to traffic flows 850 such as the bandwidth of link 212. The value of weight 802 may depend on a number of factors, such as the amount of data in traffic flow 850 or the priority of traffic flow 850. The weight 802 assigned may be static or variable. Weights 802 assigned to exemplary traffic flows 850(1) to 850(9) in FIG. 8 in the following table:

| Traffic Flow | Weight 802 |
|---|---|
| 850(1) | 10 |
| 850(2) | 7 |
| 850(3) | 5 |
| 850(4) | 5 |
| 850(5) | 3 |
| 850(6) | 4 |
| 850(7) | 2 |
| 850(8) | 11 |
| 850(9) | 9 |

As described previously, output from segmentation queues 806 is sent to the appropriate packet ordering module 812. However, cells 320 from a segmentation queue 806 are provided with bandwidth of its packet ordered stream 820 based on the weight 802 of its traffic flow 850. For example, data from traffic flows 850(1), 850(2) and 850(3) is sent to packet ordering module 812A(H). Packet ordering module 812A(H), based on the above weights 802, provides more bandwidth of packet ordered stream 820A(H) to traffic flow 850(1) than to traffic flow 850(2) and more to traffic flow 850(2) than to traffic flow 850(3). If the bandwidth of packet ordered stream 820A(H) were divided into 22 units of time, traffic flow 850(1) would receive ten (10) units of time, traffic flow 850(2) would receive seven (7) units of time and traffic flow 850(3) would receive five (5) units of time in which to send cells 320. The overall weight 808 of packet ordered stream 820A(H) is 22 (10+7+5).

The same allocation of bandwidth of packet ordered stream 820A(M) for traffic flows 850(4) and 850(5), packet ordered stream 820A(L) for traffic flows 850(6) and 850(7) a packet ordered stream 820B(H) for traffic flows 850(8) and 850(9) is provided. The overall weight 808 of packet ordered stream 820A(M) is 8, the overall weight 808 of packet ordered stream 820A(L) is 6 and the overall weight 808 of packet ordered stream 820B(H) is 20.

Ingress card 802 also provides bandwidth of link 212 into fabric 206 to a packet ordered stream 820 according to the overall weight 808 of the packet ordered stream 820 compared with other packet ordered streams 820 in link 212. For example, if the bandwidth of link 212 were divided into 36 units of time, packet ordered stream 820A(H) would receive 22 units of time, packet ordered stream 820A(M) would receive eight (8) units of time and packet ordered stream 820A(L) would receive six (6) units of time. The appropriate bandwidth of link 212 is provided to a traffic flow 850 by apportioning it bandwidth in its packet ordered stream 820 and apportioning its packet ordered stream 820 bandwidth of link 212. For example, on average, traffic flow 850(1) is provided 10 of the 22 units of time apportioned to packet ordered stream 820A(H) in link 212.

The bandwidth of link 212 from fabric 206 to an egress card 804 is similarly apportioned if sufficient bandwidth exists to service all of the traffic flows. When the traffic flows across link 212 out of fabric 206 require more bandwidth than link 212 supports, congestion occurs. High priority traffic is exhaustively serviced onto link 212 from fabric 206, followed by medium priority traffic and finally low priority traffic.

The weight provided to high priority traffic flows provides a guaranteed bandwidth through the packet ordering module and onto link 212 into the fabric 206. The medium and low priority traffic flows apportion the remaining bandwidth. Therefore, the weights of the medium priority flows only provide a relative ranking between medium flows. After all high and medium priority traffic flows are exhaustively serviced, the remaining bandwidth of link 212 is apportioned between low priority traffic flows based on the assigned weight.

While the embodiment is described for network elements 400, 500, 800 and 900, it will be appreciated that the system and method described herein may be adapted to any switching or routing system.

It is noted that those skilled in the art will appreciate that various modifications of detail may be made to the present embodiment, all of which would come within the scope of the invention.

We claim:

1. A method of transmitting variable length packets associated with a destination address through a network element having a plurality of ingress cards, a plurality of egress cards and a cell-based switch fabric between said ingress cards and said egress cards, the method comprising:
   a) segmenting at said ingress cards each incoming packet into a group of fixed length cells containing routing information;
   b) arranging said groups of fixed length cells into at least one group of corresponding traffic flows;
   c) transmitting to the switch fabric for forwarding toward a particular egress card the cells of a particular group of traffic flows on a cell-by-cell basis in an ordered sequence such that each group of cells from said particular group of traffic flows is transmitted as a contiguous group of cells without being interleaved with other cells;
   d) transmitting to the switch fabric for forwarding toward said particular egress card the cells of another traffic flow or group of traffic flows on a cell-by-cell basis in a packet ordered sequence such that each group of cells from said another group of traffic flows is transmitted as a contiguous group of cells without being interleaved with other cells;
   e) said cells being subject to becoming interleaved during transmission toward said egress card after entering the switch fabric;
   f) at said particular egress card assigning arriving cells on a cell-by-cell basis to one of a plurality of reassembly queues associated with the respective groups of traffic flows or traffic flows so as to form in each reassembly queue a non-interleaved ordered sequence of groups of contiguous cells corresponding to the segmented incoming packets from the group of traffic flows or traffic flow associated with that reassembly queue;
   g) reassembling the groups of contiguous cells in each reassembly queue into the corresponding incoming packets; and
   h) transmitting the reassembled packets in an egress traffic flow from the network element.

2. The method of claim 1, wherein the incoming packets carry data formatted according to one or more communication protocols.

3. The method of claim 2, wherein said protocols are one or more of ATM, MPLS, and IP protocols.

4. The method of claim 1, wherein groups of traffic flows correspond to respective classes of service associated with an ingress traffic flow.

5. The method of claim 4, wherein a said reassembly queue is associated with each class of service for an ingress traffic flow.

6. The method of claim 4, wherein the class of service indicates a high, medium and low traffic priority.

7. The method of claim 1, further comprising assigning weights to packets associated with ingress traffic flows, and assigning resources to the groups of traffic flows associated with the ingress traffic flows in accordance with the assigned weights.

8. A network element having a cell-based switch fabric for switching variable-length packets, comprising:
   at least one ingress card, the or each ingress card having groups of segmentation queues for storing groups of fixed length cells corresponding to segmented incoming packets;
   each group of segmentation queues providing a group of traffic flows;
   an ordering module for ordering groups of cells from the segmentation queues of a particular group of traffic flows in sequential packet order and transmitting the cells to a switch fabric for forwarding toward an egress card such that each group of cells from the particular group of traffic flows is transmitted to the switch fabric as a packet ordered contiguous group of cells without being interleaved with other cells;
   at least one additional ordering module for ordering groups of cells from the segmentation queues of another group of traffic flows or traffic flow in sequential packet order and transmitted the cells to the switch fabric for forwarding toward the egress card such that each group of cells from said another group of traffic flows is transmitted as a packet ordered contiguous group of cells without being interleaved with other cells; said cells being subject to becoming interleaved after entering the switch fabric;
   reassembly queues at the egress card associated with for the respective groups of traffic flows or traffic flows for reassembling cells into outgoing packets and transmitting the outgoing packets in an egress flow towards the destination address; and
   an assignment module for assigning each cell arriving from the switch fabric on a cell-by-cell basis to the reassembly queue associated with the group of traffic flows or traffic flow to which that cell belongs so as to form in the reassembly queue a non-interleaved ordered sequence of groups of cells corresponding to the segmented incoming packets from the group of traffic flows or traffic flow associated with that reassembly queue.

9. The network element of claim 8, wherein the ordering module is provided on an ingress card of the network element.

10. The network element of claim 8, wherein the plurality of reassembly queues and the assignment module are provided on an egress card of the network element.

11. The network element of claim 8, wherein the plurality of reassembly queues are implemented using a FPGA.

12. A method of reassembling segmented packets received from a network element, wherein the incoming packets arrive at an ingress side of the network element in a plurality of traffic flows, said incoming packets are segmented into groups of cells for transport through the network element, the cells within each group of cells corresponding to an incoming packet being ordered in a segmentation sequence and being transmitted to the network element without being interleaved with other cells, and wherein the individual cells transported through the network element are subject to leave an egress side of the network element as a stream of interleaved cells associated with different incoming packets and different ingress traffic flows, comprising:
   providing a plurality of reassembly queues at an egress card of said network element, each reassembly queue corresponding to an ingress traffic flow and being capable of storing a plurality of groups of cells;
   assigning the individual cells arriving from the network element on a cell-by-cell basis to the reassembly queue associated with the ingress traffic flow carrying the packet from which each arriving cell originated; and
   the cells assigned to the respective reassembly queues being ordered so that the reassembly queues contain groups of cells corresponding to specific incoming packets wherein the cells within each group of cells are contiguous and arranged in the correct segmentation sequence for that group of cells; and
   reassembling the original incoming packets of the traffic flow associated with each reassembly queue by combining the groups of contiguous cells in the respective reassembly queues.

13. The method of claim 12, wherein each ingress traffic flow is segmented into multiple traffic flows, and the cells of each group of cells in the multiple traffic flows of each ingress flow are forwarded to the network element in a non-interleaved manner by a cell ordering module.

14. The method of claim 12, wherein each ingress traffic flow is divided into traffic flows of different priority, and each priority traffic flow is associated with a corresponding reassembly queue at the egress card.

15. A reassembly resource for reassembling packets arriving at an ingress side of a network element in a plurality of traffic flows, wherein said packets are segmented into groups of cells for transport through the network element, the cells within each group of cells being ordered in a segmentation sequence and being transmitted to the network element without being interleaved with other cells, and wherein the individual cells transported through the network element are subject to leave an egress side of the network element as a stream of interleaved cells associated with different cell packets and different ingress traffic flows, comprising:
   a plurality of reassembly queues at an egress card of said network element, each reassembly queue corresponding to an ingress traffic flow and capable of storing a plurality of cell packets associated with a particular ingress traffic flow;
   an assignment module for examining the potentially interleaved cells arriving from the network element and assigning them on a cell-by-cell basis to the reassembly queue associated with the ingress traffic flow carrying the packet from which each arriving cell originated such that the reassembly queues contain groups of cells corresponding to specific incoming packets wherein the cells within each group of cells that are contiguous and arranged in the segmentation sequence for that group of cells; and
   a reassembler for reassembling the original incoming packets of the traffic flow associated with each reassembly queue by combining the groups of contiguous cells in the respective reassembly queues.

* * * * *